(12) United States Patent
Ferrie et al.

(10) Patent No.: US 12,480,084 B2
(45) Date of Patent: Nov. 25, 2025

(54) KIT AND METHOD FOR PREPARATION OF DIGESTIBLE SPHEROID STABILIZING HYDROGELS

(71) Applicant: CORNING INCORPORATED, Corning, NY (US)

(72) Inventors: Ann Meejin Ferrie, Salem, NH (US); Vasiliy Nikolaevich Goral, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 909 days.

(21) Appl. No.: 17/766,045

(22) PCT Filed: Sep. 29, 2020

(86) PCT No.: PCT/US2020/053181
§ 371 (c)(1),
(2) Date: Apr. 1, 2022

(87) PCT Pub. No.: WO2021/067211
PCT Pub. Date: Apr. 8, 2021

(65) Prior Publication Data
US 2022/0372421 A1    Nov. 24, 2022

Related U.S. Application Data

(60) Provisional application No. 63/056,898, filed on Jul. 27, 2020, provisional application No. 62/909,963, filed on Oct. 3, 2019.

(51) Int. Cl.
C12M 1/12    (2006.01)
C12M 1/32    (2006.01)
C12N 5/00    (2006.01)

(52) U.S. Cl.
CPC ............ *C12M 25/14* (2013.01); *C12M 23/12* (2013.01); *C12N 5/0062* (2013.01);
(Continued)

(58) Field of Classification Search
CPC ..... C12M 25/14; C12M 23/12; C12N 5/0062; C12N 5/0068; C12N 2513/00; C12N 2533/40; C12N 2537/10
See application file for complete search history.

(56) References Cited

U.S. PATENT DOCUMENTS 9,468,656 B2    10/2016    Kakulas
9,593,304 B2    3/2017    Laukkanen et al.
(Continued)

FOREIGN PATENT DOCUMENTS

CA    2903829 A1    9/2014
CN    104630148 A    5/2015
(Continued)

OTHER PUBLICATIONS

Chang SC, et al., "Injection molding of chondrocyte/alginate constructs in the shape of facial implants", J Biomed Mater Res, 2001, vol. 55, No. 4, pp. 503-511.
(Continued)

*Primary Examiner* — Michael L Hobbs
(74) *Attorney, Agent, or Firm* — Chandra J. Duncan

(57) ABSTRACT

Kits for making a spheroid-stabilizing hydrogel in a calcium-free or calcium-chelated cell culture media include (a) a gelation agent including a polygalacturonic acid (PGA) compound or an alginic acid compound, wherein the PGA compound includes at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor,
(Continued)

wherein the proton donor includes lactones, esters, or other compounds that hydrolyze in aqueous solutions to form acids over a period of from 10 minutes to 1 hour. Resultant spheroid-stabilizing hydrogels and methods of preparing the same.

19 Claims, 12 Drawing Sheets

(52) U.S. Cl.
CPC ........ *C12N 5/0068* (2013.01); *C12N 2513/00* (2013.01); *C12N 2533/40* (2013.01); *C12N 2537/10* (2013.01)

(56) References Cited

U.S. PATENT DOCUMENTS

| | | |
|---|---|---|
| 11,584,906 B2 | 2/2023 | Ferrie et al. |
| 2004/0125266 A1 | 7/2004 | Miyauchi et al. |
| 2012/0064627 A1 | 3/2012 | Khine et al. |
| 2013/0316387 A1 | 11/2013 | Mace et al. |
| 2014/0072601 A1 | 3/2014 | Connon et al. |
| 2014/0227784 A1 | 8/2014 | Ejiri et al. |
| 2015/0267164 A1 | 9/2015 | Laukkanen et al. |
| 2016/0091487 A1 | 3/2016 | Tavana et al. |
| 2016/0145600 A1* | 5/2016 | Caracci ............... C12N 13/00 435/402 |
| 2017/0226455 A1 | 8/2017 | Fang et al. |
| 2017/0342363 A1 | 11/2017 | Fang et al. |
| 2020/0000959 A1 | 1/2020 | Askari et al. |
| 2021/0155886 A1* | 5/2021 | Schober ............... C12M 25/04 |

FOREIGN PATENT DOCUMENTS

| | | |
|---|---|---|
| CN | 107849528 A | 3/2018 |
| CN | 109718397 A | 5/2019 |
| EP | 2688397 A1 | 1/2014 |
| JP | 08-023968 A | 1/1996 |
| WO | 2008/106771 A1 | 9/2008 |
| WO | 2010/069589 A1 | 6/2010 |
| WO | 2012/120102 A1 | 9/2012 |
| WO | 2014/165273 A1 | 10/2014 |
| WO | 2016/069892 A1 | 5/2016 |
| WO | 2016/166315 A1 | 10/2016 |
| WO | 2016/200888 A1 | 12/2016 |
| WO | 2017/041041 A1 | 3/2017 |
| WO | 2018/208632 A1 | 11/2018 |
| WO | 2019/010585 A1 | 1/2019 |
| WO | 2019/014610 A1 | 1/2019 |
| WO | WO-2019104069 A1 * | 5/2019 ......... C08B 37/0045 |

OTHER PUBLICATIONS

Ehrhart, et al., "A Comparative Study of Freezing Single Cell and Spheroids: Towards a New Model System for Optimizing Freezing Protocols for Cryobanking of Human Tumours", Cryobiology, vol. 58, 2009, pp. 119-127.

International Search Report and Written Opinion of the International Searching Authority; PCT/US2020/053181; mailed on Dec. 22, 2020; 10 pages; European Patent Office.

Kuo CK, et al., "Ionically crosslinked alginate hydrogels as scaffolds for tissue engineering: part 1. Structure, gelation rate and mechanical properties", Biomaterials, 2001, vol. 22, No. 6, pp. 511-521.

Lee et al., "Effect of Spheroid Aggregation on Susceptibility of Primary Pig Hepatocytes to Cryopreservation", Transplantation Proceedings, vol. 44, 2012, pp. 1015-1017.

Magalhaes et al., "Influence of Cell Culture Configuration on the Post-Cryopreservation Viability of Primary Rat Hepatocytes", Biomaterials, vol. 33, 2012, pp. 829-836.

Marler JJ, et al., "Soft-tissue augmentation with injectable alginate and syngeneic fibroblasts", Plast Reconstr Surg, 2000, vol. 105, No. 6, pp. 2049-2058.

Poncelet D, et al., "Production of alginate beads by emulsification/internal gelation. II. Physicochemistry", Applied Microbiology and Biotechnology 1995, vol. 43, pp. 644-650.

Purcell et al., "Cryopreservation of Organotypic Brain Spheroid Cultures", Atla, vol. 31, 2003, pp. 563-573.

Rowley JA, et al., "Alginate type and RGD density control myoblast phenotype", J Biomed Mater Res., 2002, vol. 60, No. 2, pp. 217-223.

Sosef et al., "Cyropreservation of Isolated Primary Rat Hepatocytes Enhanced Survival and Long-Term Hepatospecific Function", Annals of Surgery, vol. 241, No. 1, 2005, pp. 125-133.

Chinese Patent Application No. 202080070232.8, Office Action dated Aug. 27, 2024, 6 pages (English Translation only), Chinese Patent Office.

Yang et al., "Purification of sodium alginate and preparation of calcium alginate porous scaffolds", Journal of South China University of Technology (Natural Science Edition), vol. 40, 07, 2012, pp. 142-147. (English Abstract Submitted).

* cited by examiner

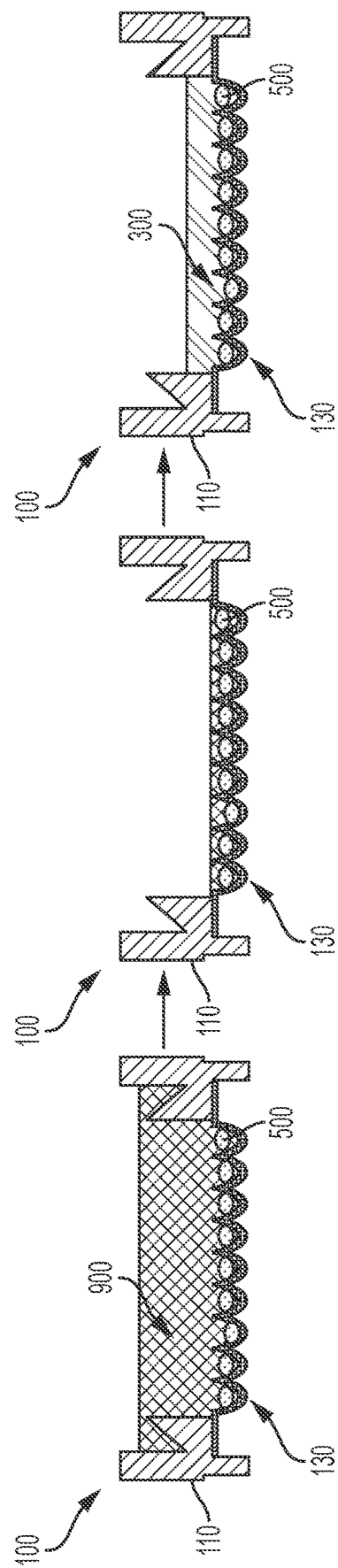

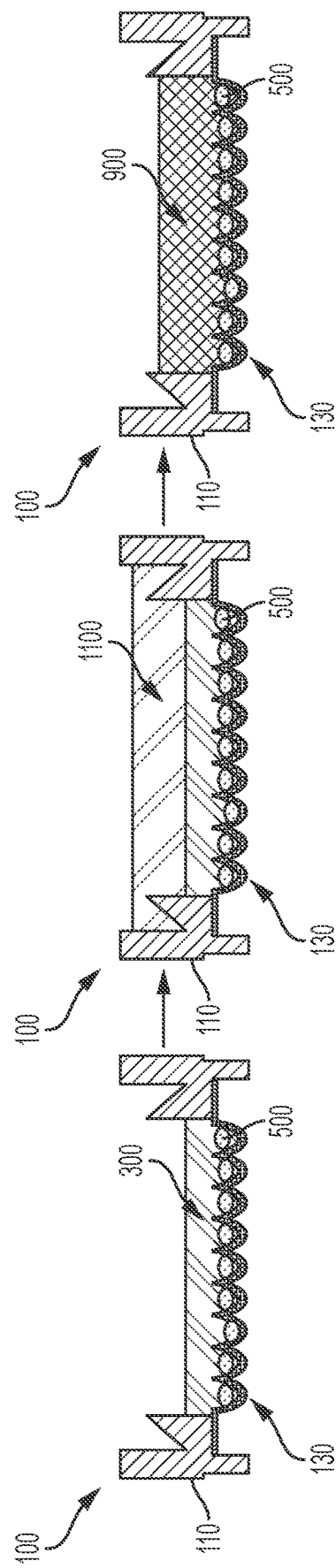

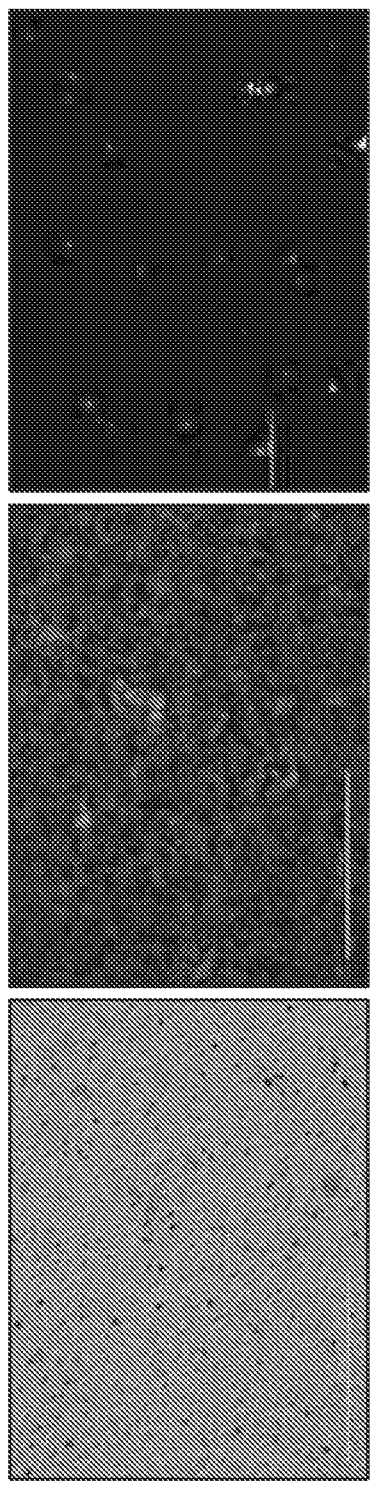

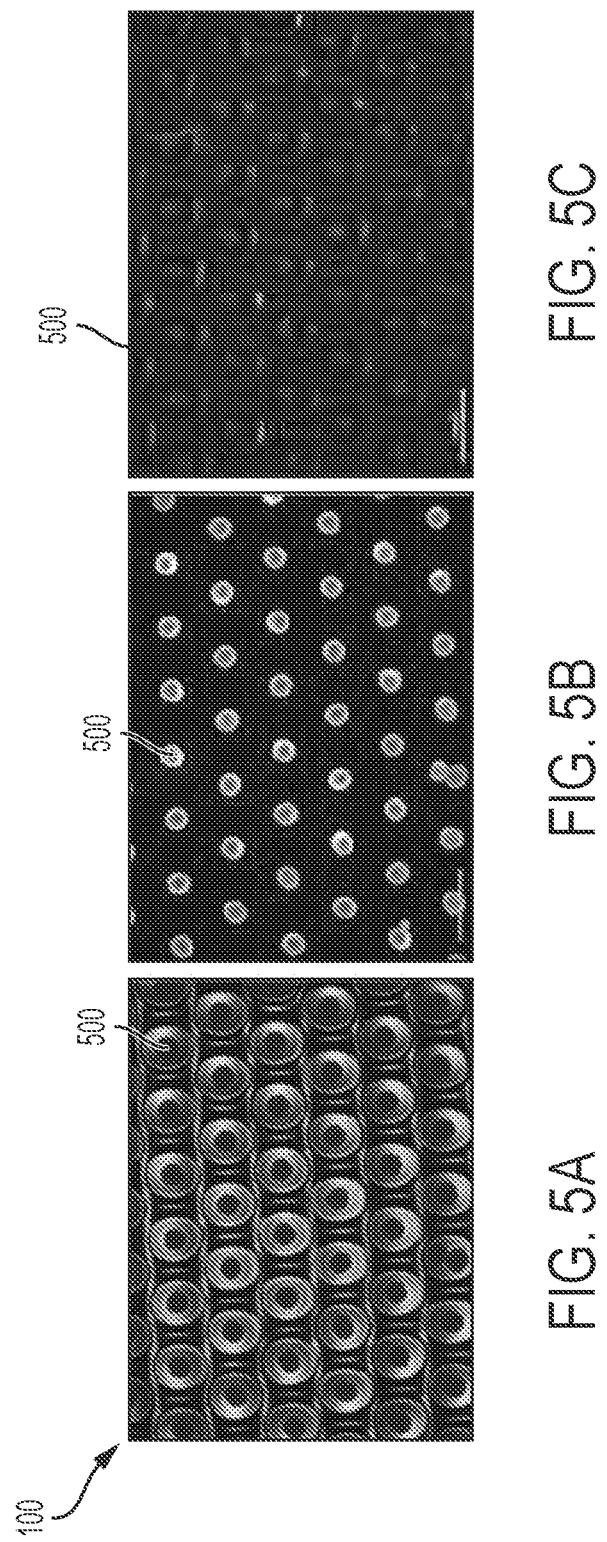

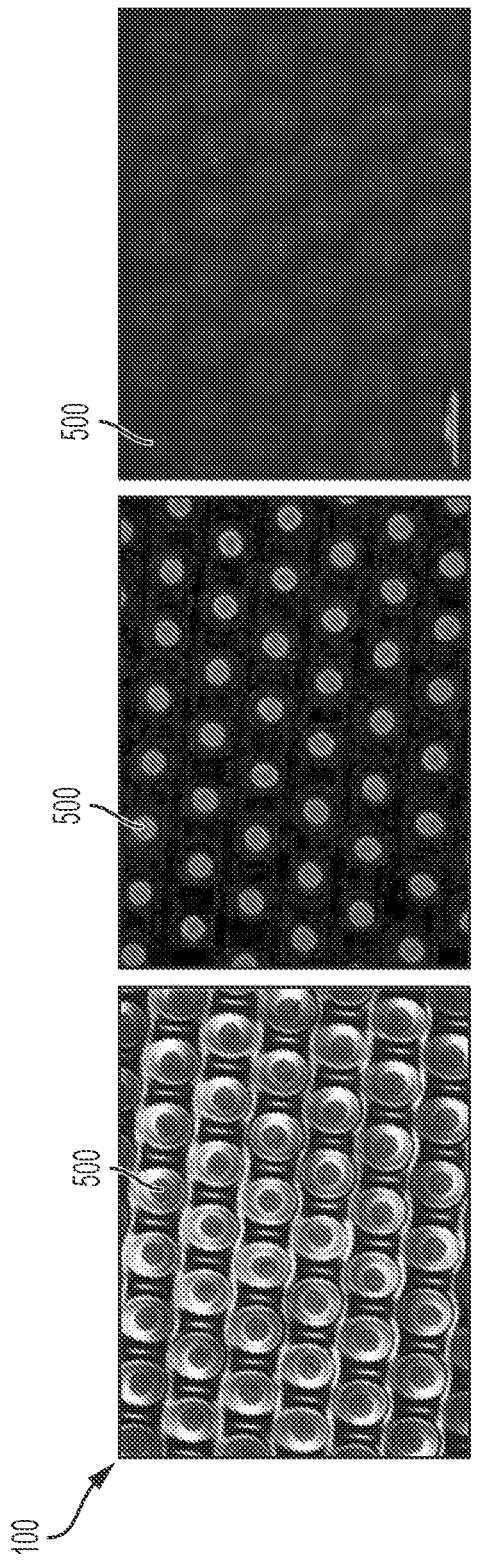

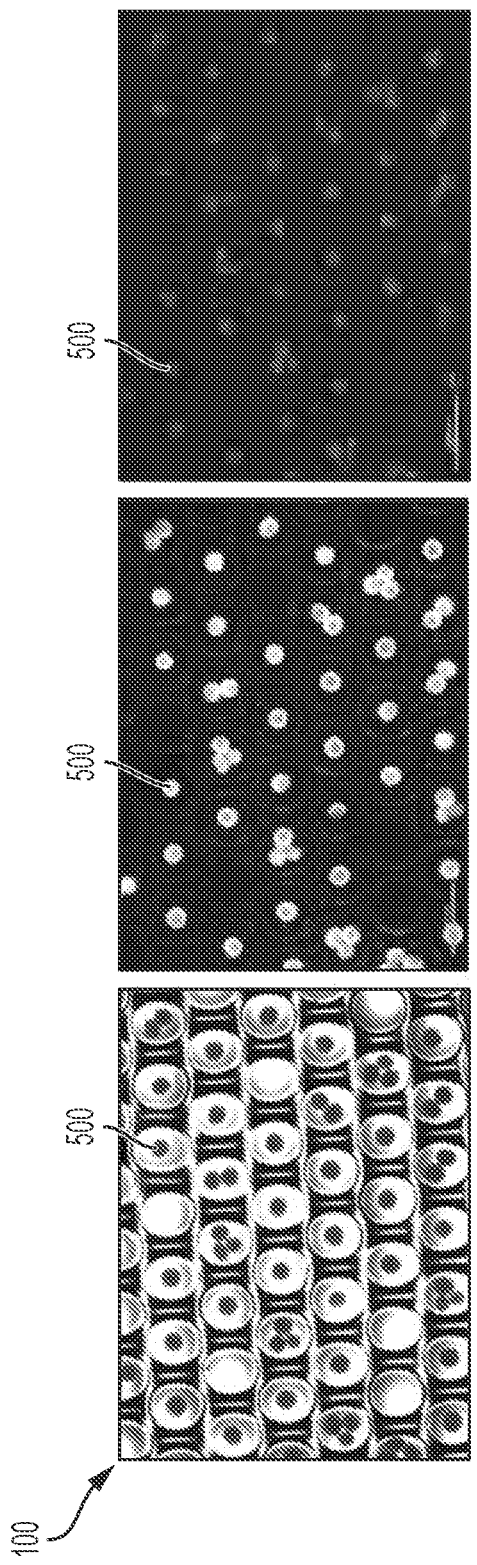

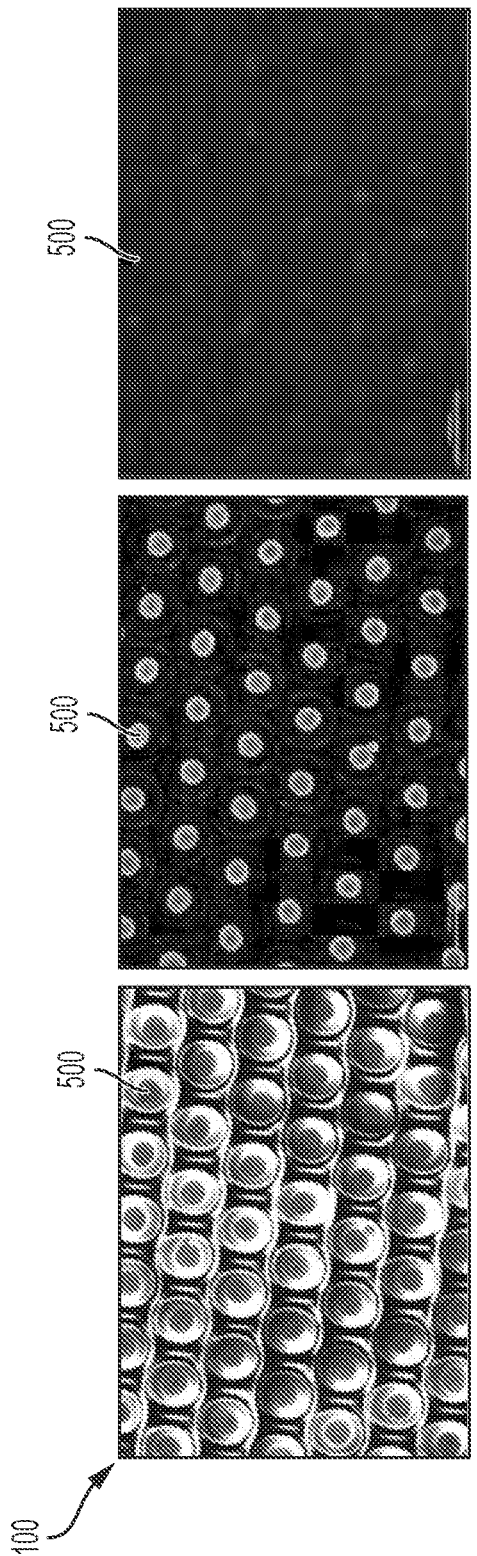

KIT AND METHOD FOR PREPARATION OF DIGESTIBLE SPHEROID STABILIZING HYDROGELS

CROSS REFERENCE TO RELATED APPLICATIONS

This is a national stage application under 35 U.S.C. § 371 of International Application No. PCT/US2020/053181, filed Sep. 29, 2020, which claims the benefit of priority under 35 U.S.C § 120 of U.S. Provisional Application Ser. No. 62/909,963 filed on Oct. 3, 2019 and U.S. Provisional Application Ser. No. 63/056,898 filed on Jul. 27, 2020, the contents of which are relied upon and incorporated herein by reference in their entireties.

BACKGROUND

Field

The present disclosure relates to digestible spheroid stabilizing hydrogels, to methods for preparing digestible spheroid stabilizing hydrogels, and to kits for preparing digestible spheroid stabilizing hydrogels.

Technical Background

Three-dimensional (hereinafter, "3D") cell cultures are artificially-created environments that allow cells to grow and/or interact (primarily with each other) in three dimensions. 3D cell cultures provide enhanced cell-cell interactions which more closely mimic the natural microenvironment of a tissue as compared to two-dimensional (hereinafter, "2D") cell culture monolayers. For example, while cells grown in 2D cell culture monolayers may attach to a substrate on which they are cultured, cells grown in 3D cell cultures may interact with each other rather than attaching to the substrate on which they are cultured.

In the last decade, 3D cell cultures have been used for growing a wide variety of cancerous and non-cancerous cell lines into spheroids or 3D cell colonies. Spheroids have been used in 3D tissue modeling in the fields of drug discovery, toxicology, and regenerative medicine. While many 3D cell culture substrates with spheroid-inducing geometries have been developed, transportation of spheroids generated on such 3D cell culture substrates can present challenges. For example, because spheroids exhibit a tendency to fuse together where direct spheroid-spheroid contact is established for even a moderate time period (e.g., ~1 hour), spheroids transported in 3D cell culture substrates where individual spheroids are not physically separated can result in the formation of spheroid aggregates. Additionally, spheroids transported in 3D cell culture substrates where individual spheroids are physically separated can also result in the formation of spheroid aggregates upon displacement of spheroids during transportation.

Accordingly, an ongoing needs exist for stabilization of spheroids during transportation.

SUMMARY

In embodiments, a digestible spheroid stabilizing hydrogel is disclosed. The digestible spheroid stabilizing hydrogel includes: (a) a gelation agent including a polygalacturonic acid (hereinafter, "PGA") compound including at least one of: (i) pectic acid or salts thereof, or (ii) partially esterified pectic acid having a degree of esterification from about 1 to about 40 mol % or salts thereof, or a gelation agent including an alginic acid compound; (b) a crosslinking agent, wherein the crosslinking agent includes a salt of a divalent cation; and (c) a proton donor, wherein the proton donor comprises lactones, esters or other compounds that hydrolyze in aqueous solutions to form acids over a period of from 10 minutes to 1 hour.

In other embodiments, a method for preparing a digestible spheroid stabilizing hydrogel is disclosed. The method includes: (a) providing a crosslinking agent and a proton donor with an aqueous medium including a gelation agent including a PGA compound or an alginic acid compound, wherein the PGA compound includes at least one of: (i) pectic acid or salts thereof, or (ii) partially esterified pectic acid having a degree of esterification from about 1 to about 40 mol % or salts thereof, wherein the crosslinking agent includes a salt of a divalent ion, and wherein the proton donor includes lactones, esters, or other slowly dissolving acids such as gluconolactone. The crosslinking agent and proton donor are provided with the aqueous medium including the PGA compound under conditions that the PGA compound is crosslinked via the crosslinking agent and the proton donor to form the digestible spheroid stabilizing hydrogel.

In still other embodiments, a kit for preparing a spheroid-stabilizing hydrogel in a calcium-free or calcium-chelated cell culture media is provided. The kit includes (a) a gelation agent including a polygalacturonic acid (PGA) compound or an alginic acid, wherein the PGA compound includes at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor, wherein the proton donor includes lactones, esters, or other compounds that hydrolyze in aqueous solutions to form acids over a period of from 10 minutes to 1 hour.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1A is a schematic depicting preparation of digestible spheroid stabilizing hydrogels, wherein spheroids are cultured in a 3D cell culture substrate (i.e., a 3D cell culture flask) in cell culture medium;

FIG. 1B is a schematic depicting preparation of digestible spheroid stabilizing hydrogels, wherein the cell culture medium is removed from the spheroids cultured in the 3D cell culture flask of FIG. 1A;

FIG. 1C is a schematic depicting preparation of digestible spheroid stabilizing hydrogels, wherein a digestible PGA spheroid stabilizing hydrogel is provided in an overlaid configuration to the spheroids cultured in the 3D cell culture flask of FIG. 1B;

FIG. 2A is a schematic depicting digestion of a digestible PGA spheroid stabilizing hydrogel, wherein a digestible PGA spheroid stabilizing hydrogel is provided in an overlaid configuration to spheroids cultured in a 3D cell culture flask;

FIG. 2B is a schematic depicting digestion of the digestible PGA spheroid stabilizing hydrogel, wherein a digestion solution is provided to the digestible PGA spheroid stabilizing hydrogel of FIG. 2A;

FIG. 2C is a schematic depicting digestion of the digestible PGA spheroid stabilizing hydrogel, wherein the digestion solution of FIG. 2B is replaced with cell culture medium;

FIG. 3A is a bright-field image of control Hep G2 cells grown on a 2D cell culture monolayer in Leibovitz's L-15 medium without a digestible PGA spheroid stabilizing hydrogel;

FIG. 3B is a fluorescent image of live control Hep G2 cells grown on a 2D cell culture monolayer in Leibovitz's L-15 medium without a digestible PGA spheroid stabilizing hydrogel and simultaneously stained with red-fluorescent ethidium homodimer and green-fluorescent calcein AM;

FIG. 3C is a fluorescent image of dead control Hep G2 cells grown on a 2D cell culture monolayer in Leibovitz's L-15 medium without a digestible PGA spheroid stabilizing hydrogel and simultaneously stained with red-fluorescent ethidium homodimer and green-fluorescent calcein AM;

FIG. 5A is a bright-field image of control Hep G2 spheroids grown on a 3D cell culture substrate in Leibovitz's L-15 medium without a digestible PGA spheroid stabilizing hydrogel;

FIG. 5B is a fluorescent image of live control Hep G2 spheroids grown on a 3D cell culture substrate in Leibovitz's L-15 medium without a digestible PGA spheroid stabilizing hydrogel and simultaneously stained with red-fluorescent ethidium homodimer and green-fluorescent calcein AM;

FIG. 5C is a fluorescent image of dead control Hep G2 spheroids grown on a 3D cell culture substrate in Leibovitz's L-15 medium without a digestible PGA spheroid stabilizing hydrogel and simultaneously stained with red-fluorescent ethidium homodimer and green-fluorescent calcein AM;

FIG. 6A is a bright-field image of Hep G2 spheroids grown on a 3D cell culture substrate in Leibovitz's L-15 medium with an overlaid digestible PGA spheroid stabilizing hydrogel (1% weight/weight pectic acid);

FIG. 6B is a fluorescent image of live Hep G2 spheroids grown on a 3D cell culture substrate in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM;

FIG. 6C is a fluorescent image of dead control Hep G2 spheroids grown on a 3D cell culture substrate in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM;

FIG. 7A is a bright-field image of control Hep G2 spheroids grown on a 3D cell culture substrate in Leibovitz's L-15 medium without a digestible PGA spheroid stabilizing hydrogel following performance of a drop test;

FIG. 7B is a fluorescent image of live control Hep G2 spheroids grown on a 3D cell culture substrate in Leibovitz's L-15 medium without a digestible PGA spheroid stabilizing hydrogel and simultaneously stained with red-fluorescent ethidium homodimer and green-fluorescent calcein AM following performance of a drop test;

FIG. 7C is a fluorescent image of dead control Hep G2 spheroids grown on a 3D cell culture substrate in Leibovitz's L-15 medium without a digestible PGA spheroid stabilizing hydrogel and simultaneously stained with red-fluorescent ethidium homodimer and green-fluorescent calcein AM following performance of a drop test;

FIG. 8A is a bright-field image of Hep G2 spheroids grown on a 3D cell culture substrate in Leibovitz's L-15 medium with an overlaid digestible PGA spheroid stabilizing hydrogel (1% weight/weight pectic acid) following performance of a drop test;

FIG. 8B is a fluorescent image of live Hep G2 spheroids grown on a 3D cell culture substrate in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM following performance of a drop test;

FIG. 8C is a fluorescent image of dead control Hep G2 spheroids grown on a 3D cell culture substrate in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM following performance of a drop test;

DETAILED DESCRIPTION

Figures 4A, 4B, 4C:
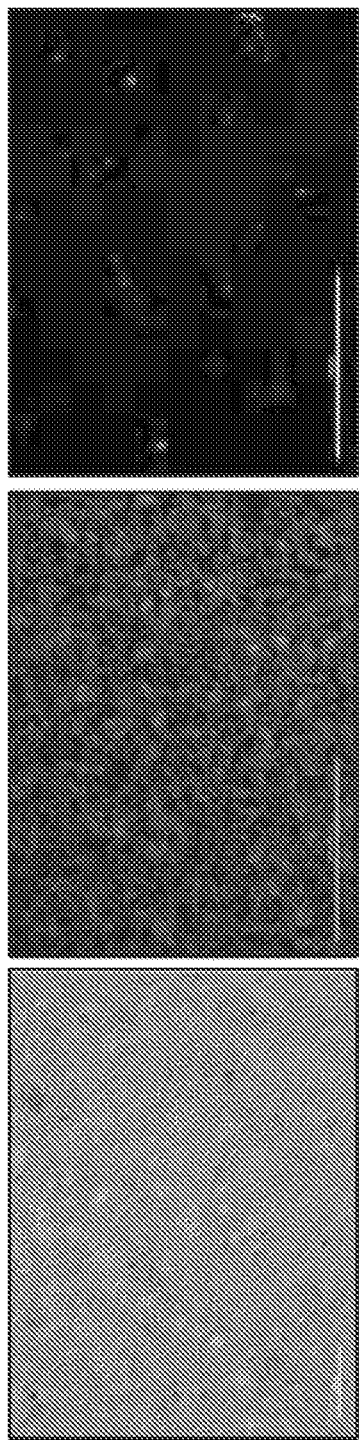
FIG. 4A is a bright-field image of Hep G2 cells grown on a 2D cell culture monolayer in Leibovitz's L-15 medium with an overlaid digestible PGA spheroid stabilizing hydrogel (1% weight/weight pectic acid)
FIG. 4B is a fluorescent image of live Hep G2 cells grown on a 2D cell culture monolayer in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM.
FIG. 4C is a fluorescent image of dead control Hep G2 cells grown on a 2D cell culture monolayer in Leibovitz's L-15 medium with an overlaid digestible PGA spheroid stabilizing hydrogel (1% weight/weight pectic acid) and simultaneously stained with red-fluorescent ethidium homodimer and green-fluorescent calcein AM.

As used herein the following terms shall have the definitions set forth below.

As used herein, the term "digestible" refers to the ability of a pectic polysaccharide to break down and/or degrade into its component galacturonic acid monomers, dimers or other oligomers. For example, pectic polysaccharide-containing spheroid stabilizing hydrogels are digestible via opening of glycosidic linkages thereof, such as, e.g., via opening of 1,4-α-D-galacturonic acid linkages. In embodiments, breaking down and/or degrading a pectic polysaccharide of a pectic polysaccharide-containing spheroid stabilizing hydrogel allows for recovery of from about 90% to about 100% viable spheroids overlaid with the pectic polysaccharide-containing spheroid stabilizing hydrogel as compared to control spheroids, such as, e.g., as compared to viability of spheroids without an overlaid pectic polysaccharide-containing spheroid stabilizing hydrogel and/or viability of spheroids with an overlaid pectic polysaccharide-containing spheroid stabilizing hydrogel prior to digestion thereof.

As used herein, the term "spheroid" refers to an aggregate, cluster, and/or assembly of cells cultured to allow for 3D growth. In contrast to cells cultured to allow for 2D growth, such as, e.g., in a monolayer, spheroids may retain 3D architecture and/or may more closely mimic a natural microenvironment of a tissue.

As used herein, the terms "stabilize" and "stabilizing" refer to the ability of a pectic polysaccharide-containing hydrogel to maintain a spheroid in a target position upon the application of force thereto. For example, in the context of a 3D cell culture substrate, a pectic polysaccharide-containing hydrogel is stabilizing where it is capable of maintaining a spheroid in a target microwell and/or target capillary structure thereof upon the application of force thereto. As another example, in the context of a 3D cell culture substrate, a pectic polysaccharide-containing hydrogel is stabilizing where it is capable of maintaining from about 90% to about 100% of spheroids in respective, target microwells and/or capillary structures thereof upon the application force thereto as compared to control spheroids, such as, e.g., as compared to positioning of spheroids in respective, target microwells and/or capillary structures of a 3D cell culture substrate without an overlaid pectic polysaccharide-containing hydrogel (in which only about 60% spheroids are retained in respective microwells).

As used herein, the term "hydrogel" refers to a semi-solid linked and/or cross-linked pectic polysaccharide matrix which is fully or partially swollen with water and/or a cell culture medium. The linking and/or cross-linking of the pectic polysaccharide matrix may be physical and/or chemical in nature, such as, e.g., via ionic interactions, covalent bonds, Van der Waal's interactions, hydrogen bonds, chain entanglement, and/or self-association. The hydrogel may be able to absorb from about 30% to 10,000% of its dry weight of water and/or a water-compatible alcohol.

As used herein, the terms "enhance" and "enhanced" refer to increased viability of spheroids grown in a 3D cell culture substrate and overlaid with a pectic polysaccharide-containing hydrogel as compared to control spheroids. For example, spheroids grown in a 3D cell culture substrate and overlaid with a pectic polysaccharide-containing hydrogel and incubated for 24 h at 4C contained 84% less dead cells as compared to control spheroids, such as, e.g., such as, e.g., as compared to viability of spheroids grown in a 3D cell culture substrate without an overlaid pectic polysaccharide-containing spheroid stabilizing hydrogel.

As used herein, the term "cell culture medium" refers to media used in the context of culturing cells which support the growth of cells, such as, e.g., 3D growth of cells. A cell culture medium may include proteins, peptides, amino acids, purines, pyrimidines, nucleotides, phospholipid precursors, vitamins, energy sources (e.g., carbohydrates), inorganic ions (e.g., calcium, magnesium, iron, phosphates, and/or sulphates), salts, buffering agents (e.g., phosphates and/or acetates), indicators for pH change (e.g., phenol red and/or bromo-cresol purple), and/or water. Components of a cell culture medium may be provided in a buffered solution, which may include a pH and/or salt concentration that mimics an in vivo environment. In embodiments, cell culture media include calcium-free or calcium-chelated cell culture media. Examples of specific cell culture media include, but should not be limited to, Eagle's Basal Medium (hereinafter, "BME"), Eagle's Minimum Essential Medium (i.e., Modified Eagle's Medium; hereinafter, "MEM"), Dulbecco's Modified Eagle Medium (hereinafter, "DMEM"), Leibovitz's L-15 Medium (hereinafter, "L-15"), Roswell Park Memorial Institute Medium (hereinafter, "RPMI"), Dulbecco's Modified Eagle Medium: Nutrient Mixture F-12 Medium (hereinafter, "DMEM/F12"), Iscove's Modified Dulbecco's Medium (hereinafter, "IMDM"), a National Collection of Type Cultures Medium (hereinafter, "NCTC"), and/or Osteogenic Induction Medium (hereinafter, "OIM"). Examples of calcium-free include DMEM from Thermo Fisher (catalog no. 21068028)

As used herein, the term "gelation" refers to the formation of a gel via linking and/or cross-linking of a pectic polysaccharide. Gelation may result in the formation of a semi-solid linked and/or cross-linked pectic polysaccharide matrix from a liquid including a pectic polysaccharide. Gelation may occur by physical linking and/or crosslinking and/or chemical linking and/or crosslinking.

As used herein, the term "overlaid configuration" refers to a pectic polysaccharide-containing hydrogel formed in situ following application to a population of spheroids in a 3D cell culture substrate. For example, a pectic polysaccharide-containing hydrogel is in an overlaid configuration where a pectic polysaccharide matrix is applied to a population of spheroids in microwells and/or capillary structures of a 3D cell culture substrate prior to gelation thereof and under conditions suitable for forming a pectic polysaccharide-containing hydrogel.

Reference will now be made in detail to embodiments of digestible spheroid stabilizing hydrogels with reference to FIGS. 1C, 2A, and 9A-11. Thereafter, embodiments of methods and kits for preparing digestible spheroid stabilizing hydrogels will be described in detail.

I. Digestible Spheroid Stabilizing Hydrogels

In embodiments, digestible spheroid stabilizing hydrogels are disclosed. The digestible spheroid stabilizing hydrogels may include (a) a gelation agent including an alginic acid compound or a PGA compound including at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor, wherein the proton donor comprises lactones, esters or other compounds that hydrolyze in aqueous solutions to form acids over a period of from 10 minutes to 1 hour.

In embodiments, the digestible spheroid stabilizing hydrogel includes (a) a gelation agent including a PGA compound. The PGA compound may be as described in International Publication No. WO/2016/200888, which is incorporated herein in its entirety by reference. In embodiments, the PGA compound is a pectic polysaccharide composed of α-1,4-linked-D-galacturonic acid monomers. The PGA compound may include: (i) pectic acid, which is a polymer of galacturonic acid, (ii) pectinic acid (i.e., partially esterified pectic acid), which is a polymer of galacturonic acid whose carboxyl groups are esterified, and/or (iii) salts of pectic acid and/or pectinic acid. In embodiments, salts of pectinic acids are pectinates.

In some embodiments, the gelation agent can include an alginate compound. The alginate compounds can include alginic acid is a linear copolymer with homopolymeric blocks of (1-4)-linked β-D-mannuronate (M) and its C-5 epimer α-L-guluronate (G) residues, respectively, covalently linked together in different sequences or blocks. In some embodiments, the alginates can include salts of alginic acid (e.g., sodium alginate is the sodium salt of alginic acid; potassium alginate is a chemical compound that is the potassium salt of alginic acid).

In embodiments, the PGA compound includes pectic acid. In embodiments, the pectic acid has the following formula:

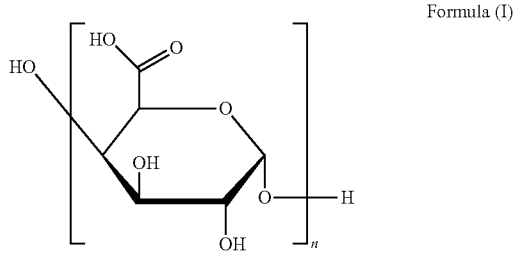

Formula (I)

In Formula I, the value of n can vary based on the pectic acid used. In some embodiments, n may be between about 1 and about 100, or about 100 or more. In some particular embodiments, n may be at least about 1 and less than or equal to about 50, about 40, about 30, or about 20. In particular embodiments, n is from about 8 to about 16.

In embodiments, the digestible spheroid stabilizing hydrogel includes from about 1% to about 2%, or from about 1% to about 3%, or from about 1% to about 4%, or from about 1% to about 5%, or from about 1% to about 10%, or about 1% weight/weight of pectic acid. It is contemplated that the digestible spheroid stabilizing hydrogel can include higher percentages weight/weight of pectic acid, depending on the application, but increases can affect the digestibility of the hydrogel. Pectic acid may be formed via hydrolysis of some pectin esters. Pectins are cell wall polysaccharides; sources of pectin include, but should not be limited to, citrus peels and apple peels. In embodiments, pectins are predominantly linear polymers having a 1,4-linked-α-D-galacturonic backbone, which is interrupted randomly by 1,2-linked L-rhamnose. In embodiments, the average molecular weight of pectins may range from about 50,000 Daltons to about 200,000 Daltons.

In embodiments, the PGA compound includes pectinic acid (i.e., partially esterified pectic acid). In embodiments, the pectinic acid has a degree of esterification of from about 1 to about 40 mol %, or from about 5 to about 30 mol %, or from about 10 to about 20 mol %. In embodiments, the PGA compound includes pectinic acid having a degree of esterification of from about 1 to about 40 mol %. Pectinic acid, or partially esterified pectic acid, may be esterified with methyl groups. Additionally, free carboxyl groups of pectinic acid may be partially and/or fully neutralized with monovalent ions such as, e.g., sodium, potassium, and/or ammonium ions.

In embodiments, the digestible spheroid stabilizing hydrogel includes from about 0.5% to about 2%, or from about 0.75% to about 1.75%, or about 1% weight/weight of pectinic acid. In embodiments, the digestible spheroid stabilizing hydrogel includes from about 0.5% to about 2%, or from about 0.75% to about 1.75%, or about 1% weight/weight of pectinic acid esterified with methyl groups.

In embodiments, the PGA compound includes salts of pectic acid and/or pectinic acid. Examples of specific salts of pectic acid and/or pectinic acid may include, but should not be limited to monovalent cation salts, such as $Na^+$ and $K^+$ salts.

In embodiments, the digestible spheroid stabilizing hydrogel includes from about 0.5% to about 2%, or from about 0.75% to about 1.75%, or about 1% weight/weight of salts of pectic acid and/or pectinic acid.

In embodiments, the PGA compound includes a mixture of pectic acid, pectinic acid, and/or salts of pectic acid and/or pectinic acid. In alternative embodiments, the PGA compound includes pure pectic acid, pectinic acid, or salts thereof. In embodiments, the digestible spheroid stabilizing hydrogel includes a blend of the PGA compound and compatible polymers. Examples of specific compatible polymers that may be used in a blend with the PGA compound include, but should not be limited to, polysaccharides chosen from dextran, substituted cellulose derivatives, alginic acid, starches, glycogen, arabinoxylans, and/or agarose; glycosaminoglycans chosen from hyaluronic acid and/or chondroitin sulfate; proteins chosen from elastin, fibroin, collagen, and/or derivatives thereof; and/or water soluble synthetic polymers chosen from polyalkylene glycol, poly (hydroxyalkyl(meth)acrylates), poly(meth)acrylamide, poly (N-vinyl-2-pyrrolidone), polyvinyl alcohol and/or derivatives thereof. Polymers may be deemed compatible in the digestible spheroid stabilizing hydrogel where their inclusion in the blend with the PGA compound does not impair digestion of the digestible spheroid stabilizing hydrogel.

In embodiments, the digestible spheroid stabilizing hydrogel includes (b) a crosslinking agent, wherein the crosslinking agent includes a salt of a divalent ion. In embodiments, the crosslinking agent includes a calcium salt. In embodiments, the calcium salt is chosen from calcium carbonate (i.e., $CaCO_3$), calcium oxalate (i.e., $CaC_2O_4$), and/or calcium phosphate (i.e., $Ca_3(PO_4)_2$), although other calcium salts that are non-toxic to the cells are contemplated. In embodiments, the calcium salt is calcium carbonate. Other divalent salts that are able to dissociate in acid conditions and have a low solubility are also contemplated. In embodiments, the calcium salt has a water solubility of from greater than about 0 mg/L to about 20 mg/L, or from about 3 mg/L to about 20 mg/L, or from about 6 mg/L to about 20 mg/L at 25° C. In embodiments, the crosslinking agent is an ionic crosslinking agent. Without being bound by the theory, it is believed that inclusion of an ionic crosslinking agent in the digestible spheroid stabilizing hydrogel crosslinks polymeric chains of PGA to form a gel in the solution. It is further believed that the low solubility of the salt reduces or prevents premature or instantaneous gelation upon mixing.

In embodiments, the digestible spheroid stabilizing hydrogel includes (c) a proton donor, wherein the proton donor comprises lactones, esters or other compounds that hydrolyze in aqueous solutions to form acids over a period of from 10 minutes to 1 hour. In embodiments, the proton donor acts as a dissociating agent to dissolve and/or slowly release the salt of the divalent ions into solution. For example, in embodiments wherein the crosslinking agent is a calcium salt, the proton donor may act as a dissociating agent to dissolve the calcium salt, e.g., calcium carbonate, and/or slowly release the $Ca^{2+}$ ions into solution. Examples of suitable proton donors include lactones, esters, or other slowly dissolving acids, such as, e.g., gluconolactone. In embodiments, the proton donor includes gluconolactone. Gluconolactone has the following formula:

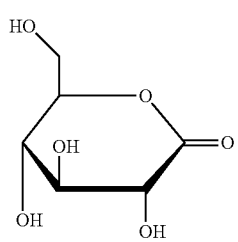

Formula (II)

In embodiments, the PGA compound is crosslinked via the crosslinking agent and the proton donor to form the digestible spheroid stabilizing hydrogel. In embodiments, the crosslinking agent provides a source of inorganic calcium ions, i.e., $Ca^{2+}$, upon exposure to the proton donor. More specifically, in embodiments, the crosslinking agent provides a source of inorganic calcium ions upon dissociation of the calcium salt, such as, e.g., $CaCO_3$, when exposed to gluconolactone. In embodiments, the digestible spheroid stabilizing hydrogel includes a molar ratio of the crosslinking agent to the proton donor of from about 0.7:2 to about 1:2 or from about 1:2 to about 1:2.3. In embodiments, the digestible spheroid stabilizing hydrogel includes a molar ratio of the crosslinking agent to the proton donor of about 1:2.

In embodiments, the digestible spheroid stabilizing hydrogels further include components of a cell culture medium which support growth of cells. In embodiments, the components of the cell culture medium support the growth of cells, such as, e.g., 3D growth of cells, and include a pH and/or salt concentration that mimics an in vivo environment. For example, the digestible spheroid stabilizing hydrogels may include proteins, peptides, amino acids, purines, pyrimidines, nucleotides, phospholipid precursors, vitamins, energy sources (e.g., carbohydrates), inorganic ions (e.g., calcium, magnesium, iron, phosphates, and/or sulphates), salts, buffering agents (e.g., phosphates and/or acetates), indicators for pH change (e.g., phenol red and/or bromo-cresol purple), and/or water.

In embodiments, the digestible spheroid stabilizing hydrogel includes from about 50% water and 50% of a cell culture medium which support growth of cells to about 0% water and 100% cell culture medium, or from about 50% DPBS and 50% cell culture medium to about 100% cell culture medium on a volume basis. In embodiments, the digestible spheroid stabilizing hydrogel includes a calcium-free cell culture medium or a calcium-chelated cell culture medium.

Referencing FIGS. 1C, 2A, 9A, and 9B, in embodiments, a digestible spheroid stabilizing hydrogel 300, as previously described, is provided with a 3D cell culture substrate 100 including spheroids 500. Suitable 3D cell culture substrates 100 for forming spheroids are known to those of ordinary skill in the art. For example, the 3D cell culture substrate 100 may be as described in International Publication No. WO/2016/069892, which is incorporated herein in its entirety by reference. Additional 3D cell culture substrates 100 may be as described in U.S. Publication No. 2004/0125266, U.S. Publication No. 2012/0064627, U.S. Publication No. 2014/0227784, U.S. Publication No. 2017/0226455, International Publication No. WO/2008/106771, International Publication No. WO/2014/165273, which are each incorporated herein in their entirety by reference.

In embodiments, the 3D cell culture substrate 100 includes a frame 110 which defines at least one microwell 130. In embodiments, the 3D cell culture substrate 100 includes a frame 110 which defines an array of microwells 150. Each microwell 130 of the 3D cell culture substrate 100 may include at least one sidewall 132 (e.g., a sidewall), a well bottom 134 (e.g., a nadir), and an open top 136 (e.g., an upper aperture). In embodiments, each microwell 130 is configured to contain an aqueous solution, such as, e.g., a cell culture medium. In embodiments, the 3D cell culture substrate 100 includes a spheroid vessel. Examples of spheroid vessels are shown in International Patent Application Publication WO 2019/014610 A1, which is incorporated herein by reference.

Figure 9A:
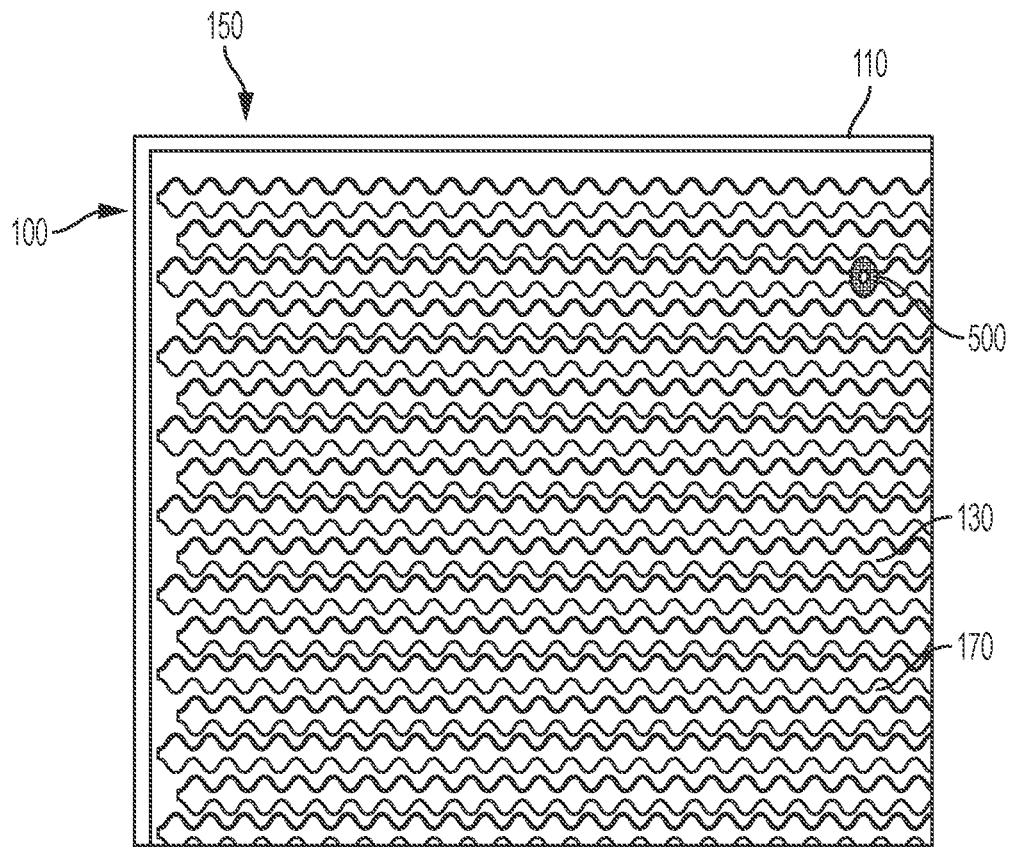
FIG. 9A is a schematic depicting a 3D cell culture substrate including an array of spheroid-containing cell culture microwells in a corrugated configuration.
Figure 9B:
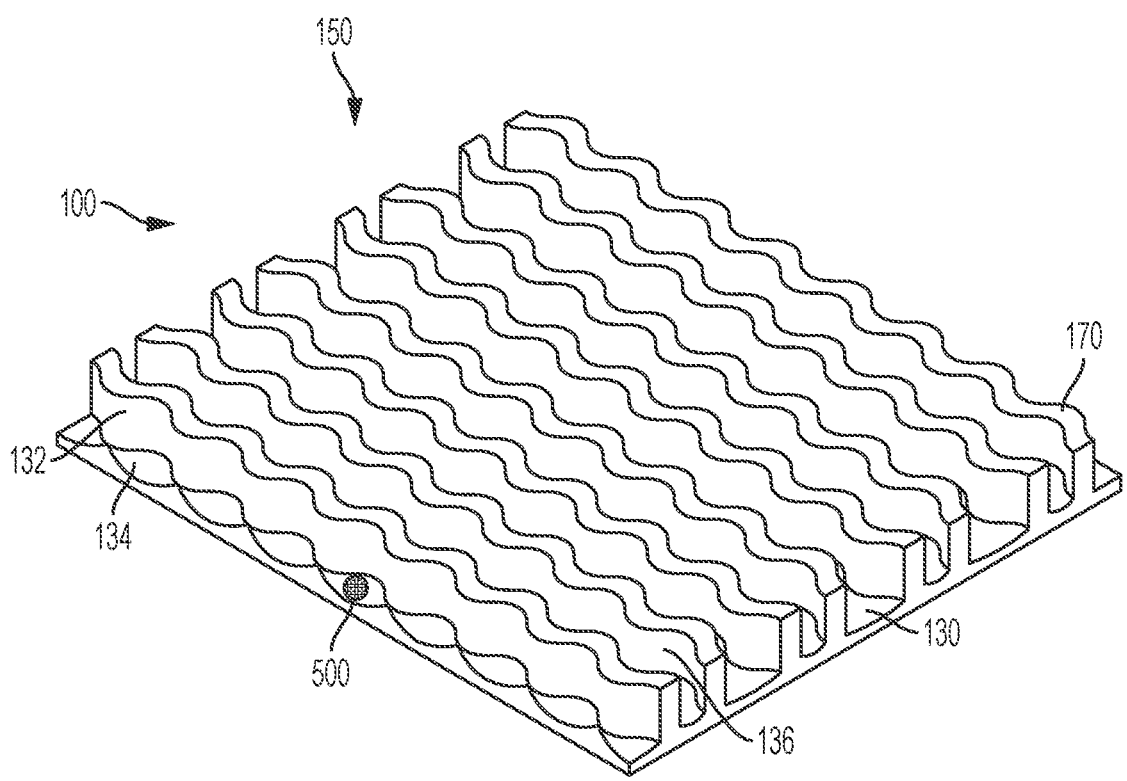
FIG. 9B is a schematic depicting a partial cut-away of the 3D cell culture substrate of FIG. 9A.

Referencing FIGS. 9A-9B, in embodiments, each microwell 130 has a spheroid inducing geometry 170 and/or a microcapillary structure 170. In embodiments, each microwell 130 has a spheroid inducing geometry 170, such as, e.g., a rounded well bottom 134 (e.g., a hemisphere or concavity found on a rounded well bottom 134). In embodiments, the spheroid inducing geometry 170 is chosen from a pillar, a discontinuous wall, a rounded well bottom, a dimpled well bottom, a pit, and/or pen tip area. In embodiments, each microwell 130 is structured and/or arranged to include a spheroid inducing geometry 170 such that it provides an environment that is conducive to the formation of spheroids 500 in culture.

Still referencing FIGS. 9A-9B, in embodiments, each microwell 130 has a microcapillary structure 170. Examples of a suitable microcapillary structure 170 include, but should not be limited to, a mouth region, a ridge, a fissure, a pillar, a discontinuous wall, a corrugated wall, a parabolic well shape, and/or a sinusoidal well shape. In embodiments, the microcapillary structure 170 facilitates the escape of air upon introduction of a solution, such as, e.g., a liquid solution, into the microwell 130. As shown in FIGS. 9A-9B, in embodiments, each microwell 130 includes a sidewall 132 which is corrugated. Thus, in embodiments wherein each microwell 130 includes a corrugated sidewall 132, an array of microwells 150 of the 3D cell culture substrate includes rows of individual microwells 130. In embodiments, the corrugated sidewall 132 is a microcapillary structure 170 from which air which is displaced upon the introduction of a solution, such as, e.g., a liquid solution, from a first (narrower) area to a wider, second area, avoiding air entrapment.

In embodiments, each microwell 130 includes a surface, such as, e.g., the frame 110, the sidewall 132, and/or the well bottom 134, which is non-adherent to cells such that the cells may interact with each other instead of with the 3D cell culture substrate 100, such as, e.g., to form spheroids. Examples of non-adherent materials which may form and/or be applied to such surfaces of the 3D cell culture substrate 100 include, but should not be limited to, perfluorinated polymers; olefins; agarose; and/or non-ionic hydrogels, such as, e.g., polyacrylamides, polyethers such as polyethyelene oxide, and polyols such as polyvinyl alcohol.

In embodiments, each microwell 130 has a mouth region adjacent to the open top 136 which provides a more open area from which the microwell 130 constricts and/or narrows to the well bottom 134. In embodiments, the mouth region of the open top 136 allows solutions introduced therein to flow to the well bottom 134, promoting aggregation of cells at the well bottom 134 and the formation of spheroids. In addition, the mouth region of the open top 136 may create a transition between an annular internal surface between the mouth region and the sidewall 132, providing a geometric structure that may prevent entrapment of air in the microwell 130. In embodiments, the mouth region may provide a transition between the open top 136 and the sidewall 132 which is not a 90° angle, reducing the formation of air bubbles in the microwell 130. In some embodiments, the height of the sidewall 132 (e.g., from the open top 136 to the well bottom 134) is equal to or greater than 100% a diameter of the microwell 130 at the mouth region of the open top 136. In some embodiments, the height of the sidewall 132 (e.g., from the open top 136 to the well bottom 134) is from about 100% to about 400%, or from about 110% to about 375%, or from about 120% to about 350% or from about 130% to about 325%, or from about 140% to about 300%, or from about 150% to about 275%, or from about 160% to about 250%, or from about 170% to about 225%, or from about 180% to about 200%, or about 190% the diameter of the microwell 130 at the mouth region of the open top 136.

Figure 10:
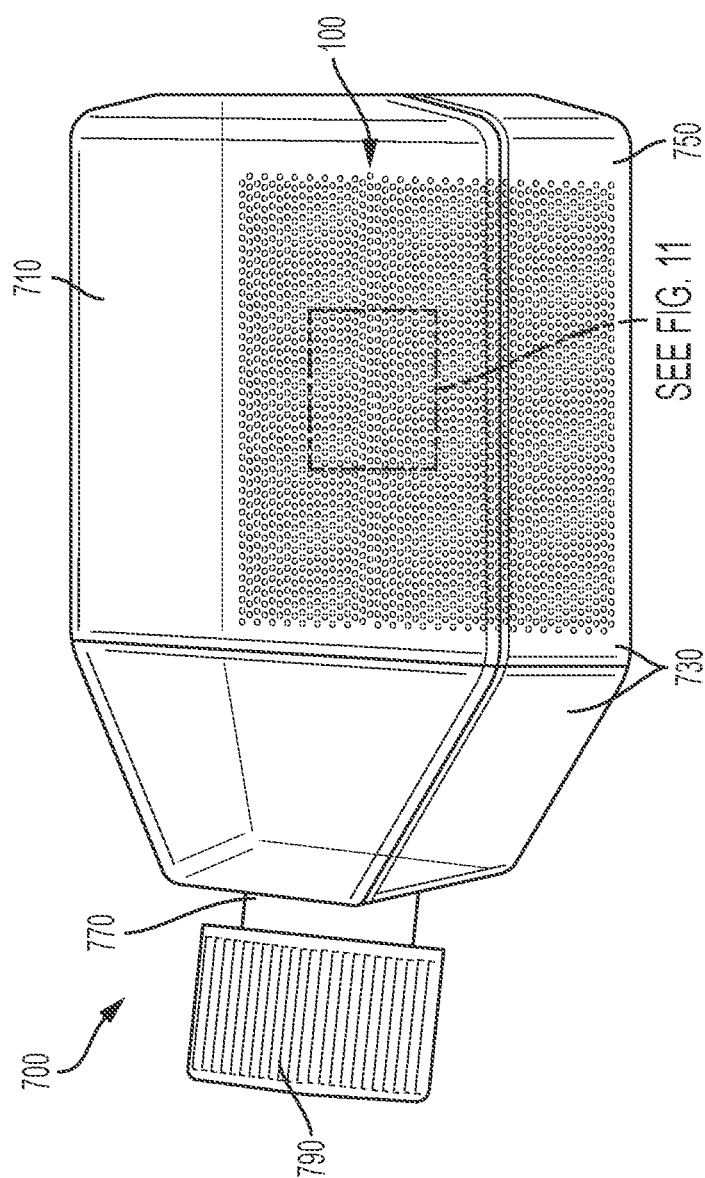
FIG. 10 depicts a culture flask having a bottom surface micropatterned with a 3D cell culture substrate including an array of spheroid-containing cell culture microwells.
Figure 11:
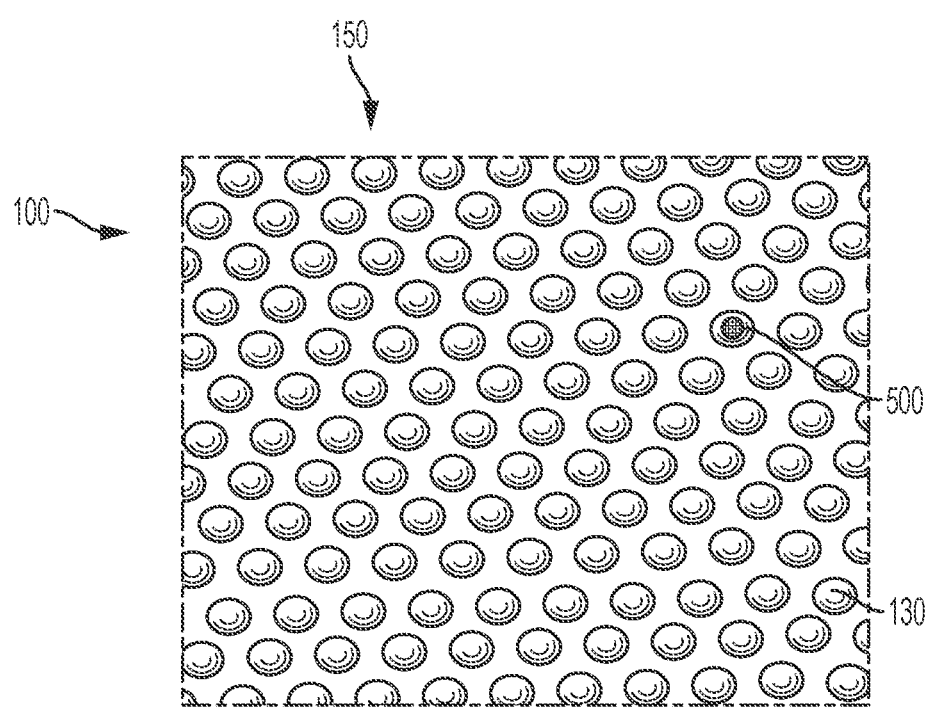
FIG. 11 depicts a magnified view of the 3D cell culture substrate including the array of spheroid-containing cell culture microwells micropatterned on the bottom surface of the culture flask of FIG. 10.

Referencing FIGS. 10-11, in embodiments, the 3D cell culture substrate 100 includes and/or is included as part of a cell culture container 700. For example, the cell culture container 700 may include a 3D cell culture substrate 100 as a surface thereof. The cell culture container 700 may be chosen from a multiwall plate, a dish, a flask, a tube, a multi-layer flask, a soft-sided flask, and/or a bag.

As shown in FIG. 10, in embodiments, the cell culture container 700 is a flask. The flask may include a top surface 710, at least one sidewall 730 extending from the 3D cell culture substrate 100 to the top surface 710, and a cell culture chamber 750 defined by the top surface 710, the at least one sidewall 730, and/or the 3D cell culture substrate 100. In embodiments, the flask includes a port 770. In further embodiments, the flask includes a port 770 having a screw top 790. The port 770 may be defined by the top surface 710, the at least one sidewall 730, and/or the 3D cell culture substrate 100. In embodiments, the port 770 functions to remove cells and/or cell culture medium to and from the cell culture chamber 750 via the use of appropriate tubing and/or connections.

In embodiments, the 3D cell culture substrate 100 may be formed from a material including, but not limited to, glass, polycarbonate, polymethyl pentene, K-resin, polymethylmethacrylate, polystyrene, polystyrene butadiene copolymers, polyester, polyethylene, polypropylene, polycyclic olefins, polyvinyl chloride, polysulfone, fluoropolymers, polyamides, fully hydrogenated styrenic polymers, polycarbonate polydimethylsiloxane (i.e., PDMS) copolymers, and/or cyclic olefin copolymers.

In embodiments, the digestible spheroid stabilizing hydrogel 300 is provided with a 3D cell culture substrate 100 including spheroids 500. In embodiments, the spheroids 500 are disposed in the microwell array 150 of the 3D cell culture substrate 100. In embodiments, the digestible spheroid stabilizing hydrogel 300 is provided with a 3D cell culture substrate 100 including spheroids 500 such that the spheroids 500 are overlaid with the digestible spheroid stabilizing hydrogel 300. In embodiments, the digestible spheroid stabilizing hydrogel 300 enhances viability of the spheroids 500 in the 3D cell culture substrate 100 and/or stabilizes the spheroids 500 in a target position in the 3D cell culture substrate 100. For example, where a digestible spheroid stabilizing hydrogel 300 is provided with a 3D cell culture substrate 100 including spheroids 500, the digestible spheroid stabilizing hydrogel 300 may stabilize individual spheroids 500 in target microwells 130 in the 3D cell culture substrate 100, such that the spheroids 500 remain in the same microwell 130 in which they were formed and/or placed prior to application of the digestible spheroid stabilizing hydrogel 300.

In embodiments, the spheroids 500 may be formed from natural cell types and/or genetically altered cell types. In embodiments, the spheroids 500 are formed from somatic cells; stem cells; progenitor cells, such as, e.g., embryonic stem cells; and/or induced pluripotent stem cells, in any desired state of differentiation, such as, e.g., pluripotent, multi-potent, fate determined, and/or immortalized. In embodiments, the spheroids 500 are formed from disease cells and/or disease model cells, such as, e.g., cancerous cells and/or transformed cells induced into a hyper-proliferative state.

In embodiments, the spheroids 500 are formed from cells derived from any desired tissue and/or organ type, including, but not limited to, adrenal; bladder; blood vessel; bone; bone marrow; brain; cartilage; cervical; endometrial; esophageal; gastrointestinal; immune system, such as, e.g., T lymphocytes, B lymphocytes, leukocytes, macrophages, and/or dendritic cells; liver; lung; lymphatic; muscle, such as, e.g., cardiac muscle; neural; ovarian; pancreatic, such as, e.g., islet cells; pituitary; prostate; renal; salivary; skin; tendon; testicular; and/or thyroid cells. In embodiments, the spheroids 500 are formed from liver cells. In embodiments, the spheroids 500 are formed from mammalian cells, such as, e.g., human, mice, rat, rabbit, dog, cat cow, pig, chicken, goat, and/or horse cells. In embodiments, the spheroids 500 are formed from one or more cell types cultured to allow for 3D cell growth. In embodiments, the spheroids 500 are formed from a single cell type and/or a mixture of cell types.

Embodiments of digestible spheroid stabilizing hydrogels 300 have been described in detail. Reference will now be made in detail to embodiments of methods for preparing digestible spheroid stabilizing hydrogels 300 with reference to FIGS. 1A-2C. Thereafter, embodiments of kits for preparing digestible spheroid stabilizing hydrogels 300 will be described in detail.

II. Methods for Preparing Digestible Spheroid Stabilizing Hydrogels

In embodiments, methods for preparing digestible spheroid stabilizing hydrogels 300 are disclosed. The methods may include: (a) providing a crosslinking agent and a proton donor with an aqueous medium including a gelation agent including a PGA compound or an alginic acid compound, wherein the PGA compound includes at least one of: (i) pectic acid or salts thereof, or (ii) partially esterified pectic acid having a degree of esterification from about 1 to about 40 mol % or salts thereof, wherein the crosslinking agent includes a salt of a divalent ion, and wherein the proton donor includes lactones, esters, or other compounds that hydrolyze in aqueous solutions to form acids over a period of from 10 minutes to 1 hour. The crosslinking agent and proton donor are provided with the aqueous medium including the gelation agent including the PGA compound under conditions that the PGA compound is crosslinked via the crosslinking agent and the proton donor to form the digestible spheroid stabilizing hydrogel 300.

In embodiments, the method includes (a) providing a crosslinking agent and a proton donor with an aqueous medium including a gelation agent including a PGA compound. The crosslinking agent, the proton donor, and the gelation agent are as described previously with regard to digestible spheroid stabilizing hydrogels 300. More specifically, the compositions and amounts employed of the crosslinking agent, the proton donor, and the gelation agent are as described previously with regard to digestible spheroid stabilizing hydrogels 300. For example, the crosslinking agent may be a calcium salt, the proton donor may be gluconolactone, and the gelation agent including the PGA compound may be pectic acid. As a further example, a molar ratio of the crosslinking agent to the proton donor of about 2:1 and about 1% weight/weight of pectic acid as the PGA compound may be provided with the aqueous medium.

In embodiments, the method includes (a) providing a crosslinking agent and a proton donor with an aqueous medium including a gelation agent including a PGA compound. In embodiments, the aqueous medium includes a cell culture medium. In embodiments, the cell culture medium includes a calcium-free cell culture medium or a calcium-chelated cell culture medium. In embodiments, the cell culture medium is chosen from BME, MEM, DMEM, L-15, RPMI, DMEM/F12, IMDM, NCTC, and/or OIM. In embodiments, the cell culture medium is L-15. In embodiments, the cell culture medium is selected such that the method is performed without the need for the addition of carbon dioxide, i.e., $CO_2$, to maintain appropriate cell culture pH. For example, without being bound by the theory, it is believed that the use of the L-15 cell culture medium as the aqueous medium allows for the method to be performed without the addition of carbon dioxide. The cell culture medium may be provided at a volume of from about 300 µL to about 10 mL, or from about 300 µL to about 3 mL, or from about 1 mL to about 10 mL with the crosslinking agent, proton donor, and the PGA compound, depending on the size of the vessel. In embodiments, the PGA compound is a separate solution from the cell culture medium. For example, the PGA compound may be provided as a solution separate from the calcium-free medium and/or the calcium-chelated medium. In embodiments, the PGA compound may be provided as a solution separate from the calcium-free medium and/or the calcium-chelated medium and mixed therewith.

In embodiments, the crosslinking agent and proton donor are provided in (a) with the aqueous medium including the gelation agent including the PGA compound under conditions that the PGA compound is crosslinked via the crosslinking agent and the proton donor to form the digestible spheroid stabilizing hydrogel 300. In embodiments, conditions that the PGA compound is crosslinked via the crosslinking agent and the proton donor include, but should not be limited to, amounts and/or concentrations of components of the method, i.e., reactants, temperature of the method, pH of the method, the mixing method employed, the volume, the purity of the reactants, and/or reaction time of the method. In embodiments, the amounts and/or concentrations of the components of the method are as previously described. In embodiments, the method is performed at ambient and/or room temperature. In some embodiment, the method is performed at temperatures ranging from about 0° C. to about 35° C., or from about 5° C. to 32° C. In embodiments, the method may be performed to maintain an appropriate cell culture pH; for example, the method may be performed to maintain a pH of from about 6.5 to about 8, or from about 7 to about 7.5. In embodiments, the method may be performed in a reaction time for gelation to occur; for example, the method may be performed in a reaction time of from about 30 seconds to about 5 minutes or longer, depending on the vessel type, the number of vessels being overlaid, the concentration of PGA or the number of spheroids being encapsulated. Without being bound by the theory, it is believed that the reaction time for gelation to occur may depend on the amounts and/or concentrations of the crosslinking agent and/or the proton donor; for example, a lower amount and/or concentration of the crosslinking agent and/or the proton donor may result in a longer reaction time for gelation to occur. Conversely, as another example, a higher amount and/or concentration of the crosslinking agent and/or the proton donor may result in a shorter reaction time for gelation to occur. Further, it is noted that gelation may be diffusion-limited due to crosslinking at a surface of the digestible spheroid stabilizing hydrogel 300.

Gelation may occur via physical and/or chemical linking and/or crosslinking. In embodiments, gelation of the digestible spheroid stabilizing hydrogel 300 occurs via ionic linking and/or cross-linking of the PGA compound. Ionic linking and/or crosslinking of the PGA compound may be achieved via use of an ionic crosslinking agent, such as, e.g., a calcium salt. As noted previously with regard to digestible spheroid stabilizing hydrogels 300, the crosslinking agent may provide a source of calcium ions upon exposure to the proton donor. In embodiments, the proton donor, e.g., gluconolactone, hydrolyzes into gluconic acid in a pH and temperature rate dependent manner, to provide a source of calcium ions upon exposure to the crosslinking agent, as described previously. In embodiments, the crosslinking agent and the proton donor are provided at a molar ratio of about 2:1.

In embodiments, (a) providing the crosslinking agent and the proton donor with the aqueous medium including the gelation agent including the PGA compound includes: (1) mixing the crosslinking agent with the aqueous medium including the gelation agent including the PGA compound to form an aqueous solution, and/or (2) initiating crosslinking of the PGA compound via providing the gluconolactone with the aqueous solution. With regard to (1), in embodiments, mixing the crosslinking agent with the aqueous medium, such as, e.g., the cell culture medium, including the gelation agent including the PGA compound to form an aqueous solution includes vortexing to provide a substantially homogeneous, aqueous solution. Also, with regard to (1), in embodiments, the gelation agent including the PGA compound is provided with and/or added to the aqueous medium, such as, e.g., the cell culture medium, prior to providing the crosslinking agent thereto. Still with regard to (1), in embodiments, the crosslinking agent is mixed prior to providing with the aqueous medium and the gelation agent including the PGA compound.

With regard to (2), in embodiments, crosslinking of the PGA compound is initiated by providing the gluoconolactone to the aqueous solution formed in (1). In embodiments, providing the gluconolactone to the aqueous solution formed in (1) includes mixing the gluconolactone with the aqueous solution.

In embodiments, the methods for preparing digestible spheroid stabilizing hydrogels 300 further include: (b) providing the crosslinking agent, the proton donor, and the aqueous medium including the gelation agent including the PGA compound of (a) with a 3D cell culture substrate 100 including spheroids 500 prior to gelation of the digestible spheroid stabilizing hydrogel 300. The 3D cell culture substrate 100 and the spheroids 500 may be as previously described with regard to the digestible spheroid stabilizing hydrogel 300. In embodiments, the spheroids 500 are disposed in a microwell array 150 of the 3D cell culture substrate 100. With regard to (b), in embodiments, providing the crosslinking agent, the proton donor, and the aqueous medium including the gelation agent including the PGA compound of (a) with the 3D cell culture substrate 100 includes applying the crosslinking agent, the proton donor, and the aqueous medium including the gelation agent including the PGA compound of (a) to at least one of the microwells 130 and/or the array of microwells 150 including the spheroids 500. In embodiments, the digestible spheroid stabilizing hydrogel 300 forms in situ upon application to the at least one of the microwells 130 and/or the array of microwells 150 including the spheroids 500. In this way, gelation of the aqueous solution of (a) does not occur prior to application to the 3D cell culture substrate 100. Also, in this way, the digestible spheroid stabilizing hydrogel 300 may form in an overlaid configuration on and/or in the at least one microwell 130 and/or the array of microwells 150 of the 3D cell culture substrate 100.

Referencing FIGS. 1C and 2A, digestible spheroid stabilizing hydrogels 300 prepared according to the methods described previously are depicted. Specifically, digestible spheroid stabilizing hydrogels 300 prepared according to the described methods are depicted in an overlaid configuration.

Referencing FIGS. 1A-1B, prior to preparing and/or overlaying the digestible spheroid stabilizing hydrogels 300 as described previously, spheroids 500 may be cultured in a 3D cell culture substrate 100. Specifically, as depicted in FIG. 1A, spheroids 500 may be cultured in a 3D cell culture substrate 100, as previously described, in a cell culture medium 900, as also previously described. Then, referencing FIG. 1B, prior to preparing and/or overlaying the digestible spheroid stabilizing hydrogels 300 as previously described, the cell culture medium 900 may be removed from the 3D cell culture substrate 100. The methods for preparing and/or overlaying the digestible spheroid stabilizing hydrogels 300 may then be performed as previously described, and as depicted in FIGS. 1C and 2A.

Referencing FIGS. 2B-2C, after preparing and/or overlaying the digestible spheroid stabilizing hydrogels 300, as described previously, the digestible spheroid stabilizing hydrogels 300 may be digested. For example, the digestible spheroid stabilizing hydrogels 300 may be digested via providing and/or adding digesting agents 1100, such as, e.g., a digestion solution 1100. In embodiments, the digesting agents 1100 and/or the digestion solution 1100 include agents for breaking down the digestible spheroid stabilizing hydrogel 300. For example, the digesting agents 1100 and/or digestion solution 1100 may include at least one pectinase, at least one alginate lyase (or alginase), and/or at least one chelator. As a further example, the digesting agents 1100 and/or digestion solution 1100 may include at least one pectinase and/or at least one chelator. As a further example, the digesting agents 1100 and/or digestion solution 1100 may include at least one alginase and/or at least one chelator.

In embodiments, the pectinase and/or alginase may be chosen from a hydrolase, a lyase, and/or an esterase. The pectinase and/or alginase may function to digest and/or degrade the digestible spheroid stabilizing hydrogels 300 via its catalyzing action. For example, the pectinase and/or alginase may function to dissociate the digestible spheroid stabilizing hydrogels 300 and release the spheroids therefrom. In embodiments, the pectinase is produced from *Aspergillus niger*. According to embodiments, the alginase can be isolated from various sources, including marine algae, marine mollusks (*Littorina* spp., *Haliotis* spp, *Turbo cornutus*), and a wide range of marine and terrestrial bacteria. Examples of embodiments of this disclosure used commercially available alginate lyase from Sigma-Aldrich (Product Number: A1603, CAS Number: 9024-15-1). In embodiments, the pectinase and/or alginase is provided with and/or added to the digestible spheroid stabilizing hydrogels 300, as previously described, at a concentration of from about 10 U/ml to about 1000 U/ml, or from about 20 U/ml to about 500 U/ml, or from about 50 U/ml to about 200 U/ml, or about 100 U/ml.

In embodiments, the chelator may be chosen from ethyelendiaminetetraacetic acid (i.e., EDTA), cyclohexanediaminetetracetic acid (i.e., CDTA), ethylene glycol tetraacetic acid (i.e., EGTA), citric acid, and/or tartaric acid. In embodiments, the chelator is EDTA. In some embodiments, the chelator is BAPTA. In embodiments, the pectinase is mixed with the chelator prior to providing the digestion solution 1100 with the digestible spheroid stabilizing hydrogels 300. In embodiments, the pectinase mixed with the chelator, i.e., the digestion solution, is provided with and/or added to the digestible spheroid stabilizing hydrogels 300 at a volume which is about twice that of the digestible spheroid stabilizing hydrogels 300. For example, to a microwell 130 including 2 mL of the digestible spheroid stabilizing hydrogel 300, 4 mL of the digestion solution may be provided therewith and/or added thereto.

In embodiments, the digestion solution 1100 is provided with the digestible spheroid stabilizing hydrogels 300 for a digestion reaction time. For example, the digestion solution 1100 may be provided with the digestible spheroid stabilizing hydrogels 300 for a sufficient reaction time to allow the digestible spheroid stabilizing hydrogels 300 to break down and/or degrade into component galacturonic acid monomers. Without being bound by the theory, it is believed that the reaction time for digestion to occur may depend on the amounts and/or concentrations of the gelation agent including the PGA compound; for example, a lower amount and/or concentration of the PGA compound may result in a shorter reaction time for digestion to occur. Conversely, as another example, a higher amount and/or concentration of the PGA compound may result in a shorter reaction time for digestion to occur. By digesting the digestible spheroid stabilizing hydrogels 300 in a 3D cell culture substrate 100 including spheroids 500, the spheroids 500 may be recovered. In embodiments, breaking down and/or degrading a digestible spheroid stabilizing hydrogel 300 allows for recovery of viable spheroids 500 overlaid with the digestible spheroid stabilizing hydrogel 300.

Referencing FIGS. 2B-2C, following digestion and/or recovery of the spheroids 500, the digestion solution 1100 may be replaced with cell culture medium 900. Specifically, the digestion solution 1100 may be removed and the cell culture medium 900 may be provided with and/or added to the spheroids 500 disposed in the 3D cell culture substrate 100.

Embodiments of methods for preparing digestible spheroid stabilizing hydrogels 300 have been described in detail. Reference will now be made in detail to embodiments of kits for preparing digestible spheroid stabilizing hydrogels 300.

III. Kits for Preparing Spheroid Stabilizing Hydrogels

In embodiments, kits for preparing and/or making spheroid-stabilizing hydrogels 300 in a calcium-free or calcium-chelated cell culture media are disclosed. The kits may include: (a) a gelation agent including an alginic acid or a PGA compound including at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor, wherein the proton donor includes lactones, esters, or other compounds that hydrolyze in aqueous solutions to form acids over a period of from 10 minutes to 1 hour. In embodiments, the kit also includes (d) a 3D cell culture substrate 100.

The 3D cell culture substrate 100, gelation agent, crosslinking agent, and proton donor are as previously described with regard to digestible spheroid stabilizing hydrogels 300 and/or methods for preparing digestible spheroid stabilizing hydrogels 300. For example, the gelation agent including the PGA compound may be pectic acid, the crosslinking agent may be a calcium salt, and the proton donor may be gluconolactone. As another example, the 3D cell culture substrate 100 may be a spheroid vessel.

In embodiments, the 3D cell culture substrate 100 includes an array of microwells 150 including at least one capillary structure 170 and/or spheroid inducing geometry 170. In embodiments, the at least one capillary structure 170 is chosen from a mouth region, a ridge, a fissure, a pillar, a discontinuous wall, a corrugated wall, a parabolic well shape, and/or a sinusoidal well shape. In embodiments, the spheroid inducing geometry 170 is chosen from a pillar, a discontinuous wall, a rounded well bottom, a dimpled well bottom, a pit, and/or pen tip area. In embodiments, the 3D cell culture substrate 100 includes and/or is included as part of a cell culture container 700. The cell culture container 700 may be chosen from a multiwall plate, a dish, a flask, a tube, a multi-layer flask, a soft-sided flask, and/or a bag.

In embodiments, the kits for preparing and/or making digestible spheroid stabilizing hydrogels 300 further include a cell culture medium. In embodiments, the cell culture medium is a calcium-free cell culture medium or a calcium-chelated cell culture medium. The cell culture medium is as previously described with regard to digestible spheroid stabilizing hydrogels and/or methods for preparing and/or making digestible spheroid stabilizing hydrogels 300. In embodiments, the PGA compound is a separate solution from the cell culture medium. For example, the PGA compound may be provided as a solution separate from the calcium-free medium and/or the calcium-chelated medium. In embodiments, the PGA compound may be provided as a solution separate from the calcium-free medium and/or the calcium-chelated medium and mixed therewith.

In embodiments, the kits for preparing and/or making digestible spheroid stabilizing hydrogels 300 further include digesting agents for breaking down the digestible spheroid stabilizing hydrogel 300. In embodiments, the digesting agents include a pectinase and/or a chelator. The pectinase and chelator are as previously described with regard to digestible spheroid stabilizing hydrogels 300 and/or methods for preparing digestible spheroid stabilizing hydrogels 300. In embodiments, the chelator is chosen from EDTA, CDTA, ETGA, citric acid, and/or tartaric acid. In embodiments, the chelator is EDTA.

In embodiments, the kit further includes instructions to provide guidance on the use of the 3D cell culture substrate 100, the gelation agent including the PGA compound, the crosslinking agent, the proton donor, the cell culture medium, and/or the digesting agents. For example, the kit may include instructions concerning the methods for preparing the digestible spheroid stabilizing hydrogels 300 and/or digesting the digestible spheroid stabilizing hydrogels 300, as previously described. In embodiments, the kit includes instructions for: (a) providing a crosslinking agent and a proton donor with an aqueous medium including a gelation agent including a PGA compound and associated reaction conditions, and/or digesting the digestible spheroid stabilizing hydrogels 300 with digesting agents 1100 and associated reaction conditions, as previously described with regard to methods for preparing digestible spheroid stabilizing hydrogels 300. It is understood that the instructions would convey the use of the 3D cell culture substrate 100, the gelation agent including the PGA compound, the crosslinking agent, the proton donor, the cell culture medium, and/or the digesting agents, as described previously.

It should now be understood that various aspects of digestible spheroid stabilizing hydrogels, methods for preparing digestible spheroid stabilizing hydrogels, and kits for preparing and/or making digestible spheroid stabilizing hydrogels are described herein and that such aspects may be utilized in conjunction with various other aspects.

In a first aspect, the disclosure provides a digestible spheroid stabilizing hydrogel including: (a) a gelation agent including an alginic acid or a polygalacturonic acid (PGA) compound including at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor, wherein the proton donor includes lactones, esters, or other compounds that hydrolyze in aqueous solutions to form acids over a period of from 10 minutes to 1 hour, and wherein the PGA compound is crosslinked via the crosslinking agent and the proton donor to form the digestible spheroid stabilizing hydrogel.

In a second aspect, the disclosure provides a digestible spheroid stabilizing hydrogel of the first aspects, in which the PGA compound includes pectic acid.

In a third aspect, the disclosure provides a digestible spheroid stabilizing hydrogel of the first or the second aspect, in which the salt of a divalent ion includes a calcium salt.

In a fourth aspect, the disclosure provides a digestible spheroid stabilizing hydrogel of the first to the third aspect, in which the salt of a divalent ion includes a calcium salt chosen from calcium carbonate, calcium sulfate, calcium phosphate, or combination thereof.

In a fifth aspect, the disclosure provides a digestible spheroid stabilizing hydrogel of the first to the fourth aspects, in which the salt of a divalent ion includes calcium carbonate.

In a sixth aspect, the disclosure provides a digestible spheroid stabilizing hydrogel of the first to the fifth aspects, in which the digestible spheroid stabilizing hydrogel includes: about 1% weight/weight of the PGA compound, and a molar ratio of the crosslinking agent to the proton donor of about 2:1.

In a seventh aspect, the disclosure provides a digestible spheroid stabilizing hydrogel of the first to the sixth aspects, in which the digestible spheroid stabilizing hydrogel includes: calcium carbonate as the salt of a divalent ion; about 1% weight/weight of the pectic acid; gluconolactone as the proton donor; and a molar ratio of the calcium carbonate to the gluconolactone of about 2:1.

In an eighth aspect, the disclosure provides a digestible spheroid stabilizing hydrogel of the first to the seventh aspects, in which the digestible spheroid stabilizing hydrogel further includes components of a cell culture medium which support growth of cells.

In a ninth aspect, the disclosure provides a digestible spheroid stabilizing hydrogel of the first to the eighth aspects, in which the digestible spheroid stabilizing hydrogel further includes a calcium-free or calcium-chelated cell culture medium.

In a tenth aspect, the disclosure provides a digestible spheroid stabilizing hydrogel of the first to the ninth aspects, in which the digestible spheroid stabilizing hydrogel is provided with a three-dimensional (3D) cell culture substrate including spheroids.

In an eleventh aspect, the disclosure provides a digestible spheroid stabilizing hydrogel of the first to the tenth aspects, in which the digestible spheroid stabilizing hydrogel is provided with a three-dimensional (3D) cell culture substrate including spheroids, and in which the digestible spheroid stabilizing hydrogel enhances viability of the spheroids in the 3D cell culture substrate and/or stabilizes the spheroids in a target position in the 3D cell culture substrate.

In a twelfth aspect, the disclosure provides a digestible spheroid stabilizing hydrogel of the first to the eleventh aspects, in which the digestible spheroid stabilizing hydrogel is provided with a spheroid vessel.

In a thirteenth aspect, the disclosure provides a digestible spheroid stabilizing hydrogel of the first to the twelfth aspects, in which the salt of a divalent ion includes a calcium salt having a water solubility of from greater than 0 mg/L to about 20 mg/L at 25° C.

In a fourteenth aspect, the disclosure provides a digestible spheroid stabilizing hydrogel of the first to the thirteenth aspects, in which the proton donor includes gluconolactone.

In a fifteenth aspect, the disclosure provides a method for preparing a digestible spheroid stabilizing hydrogel, the method including: (a) providing a crosslinking agent and a proton donor with an aqueous medium including a gelation agent including a polygalacturonic acid (PGA) compound or an alginic acid, wherein the PGA compound includes at least one of: (i) pectic acid or salts thereof, or (ii) partially esterified pectic acid having a degree of esterification from about 1 to about 40 mol % or salts thereof, wherein the crosslinking agent includes a salt of a divalent ion, wherein the proton donor includes lactones, esters, or other compounds that hydrolyze in aqueous solutions to form acids over a period of from 10 minutes to 1 hour, under conditions that the PGA compound is crosslinked via the crosslinking agent and the proton donor to form the digestible spheroid stabilizing hydrogel.

In a sixteenth aspect, the disclosure provides a method for preparing a digestible spheroid stabilizing hydrogel of the fifteenth aspect, in which the salt of a divalent ion includes a calcium salt.

In a seventeenth aspect, the disclosure provides a method for preparing a digestible spheroid stabilizing hydrogel of the fifteenth or sixteenth aspect, in which the PGA compound includes pectic acid, and the salt of a divalent ion includes calcium carbonate.

In an eighteenth aspect, the disclosure provides a method for preparing a digestible spheroid stabilizing hydrogel of the fifteenth to the seventeenth aspects, in which the aqueous medium includes a cell culture medium.

In a nineteenth aspect, the disclosure provides a method for preparing a digestible spheroid stabilizing hydrogel of the fifteenth to the eighteenth aspects, in which the aqueous medium includes a calcium-free or calcium-chelated cell culture medium.

In a twentieth aspect, the disclosure provides a method for preparing a digestible spheroid stabilizing hydrogel of the fifteenth to the nineteenth aspects, in which (a) providing the crosslinking agent and the proton donor with the aqueous medium including the gelation agent including the PGA compound includes: (1) mixing the crosslinking agent with the aqueous medium including the gelation agent including the PGA compound to form an aqueous solution, and (2) initiating crosslinking of the PGA compound via providing the proton donor with the aqueous solution.

In a twenty-first aspect, the disclosure provides a method for preparing a digestible spheroid stabilizing hydrogel of the fifteenth to the twentieth aspects, in which (a) providing the crosslinking agent and the proton donor with the aqueous medium including the gelation agent including the PGA compound includes: (1) mixing the crosslinking agent with the aqueous medium including the gelation agent including the PGA compound to form an aqueous solution, and (2) initiating crosslinking of the PGA compound via mixing the proton donor with the aqueous solution.

In a twenty-second aspect, the disclosure provides a method for preparing a digestible spheroid stabilizing hydrogel of the fifteenth to the twenty-first aspects, in which the digestible spheroid stabilizing hydrogel includes: about 1% weight/weight of the PGA compound, wherein the PGA compound is pectic acid; and a molar ratio of the crosslinking agent to the proton donor of about 2:1.

In a twenty-third aspect, the disclosure provides a method for preparing a digestible spheroid stabilizing hydrogel of the fifteenth to the twenty-second aspects, in which the method further includes: (b) providing the crosslinking agent, the proton donor, and the aqueous medium including the gelation agent including the polygalacturonic acid (PGA) compound of (a) with a three-dimensional (3D) cell culture substrate including spheroids prior to gelation of the digestible spheroid stabilizing hydrogel, such that the digestible spheroid stabilizing hydrogel forms in situ.

In a twenty-fourth aspect, the disclosure provides a method for preparing a digestible spheroid stabilizing hydrogel of the twenty-third aspect, in which the 3D cell culture substrate includes an array of microwells including at least one capillary structure and spheroid inducing geometry, the spheroids are disposed in the array of microwells, and (b) includes applying the crosslinking agent, the proton donor, and the aqueous medium including the gelation agent including the polygalacturonic acid (PGA) compound of (a) to at least one of the microwells.

In a twenty-fifth aspect, the disclosure provides a method for preparing a digestible spheroid stabilizing hydrogel of the twenty-third or the twenty-fourth aspect, in which the digestible spheroid stabilizing hydrogel forms in an overlaid configuration.

In a twenty-sixth aspect, the disclosure provides a method for preparing a digestible spheroid stabilizing hydrogel of the fifteenth to the twenty-fifth aspects, in which the method further includes: providing pectinase or alginase.

In a twenty-seventh aspect, the disclosure provides a method for preparing a digestible spheroid stabilizing hydrogel of the twenty-sixth aspect, in which the pectinase or alginase is added to dissociate the hydrogel and release spheroids therefrom.

In a twenty-eighth aspect, the disclosure provides a method for preparing a digestible spheroid stabilizing hydrogel of the fifteenth to the twenty-seventh aspects, in which the proton donor includes gluconolactone.

In a twenty-ninth aspect, the disclosure provides a kit for preparing and/or making a digestible spheroid stabilizing hydrogel, the kit including: (a) a gelation agent including an alginic acid or a polygalacturonic acid (PGA) compound including at least one of: (i) pectic acid or salts thereof, or (ii) partially esterified pectic acid having a degree of esterification from about 1 to about 40 mol % or salts thereof; (b) a crosslinking agent, wherein the crosslinking agent includes a salt of a divalent ion; and (c) a proton donor, wherein the proton donor includes lactones, esters, or other compounds that hydrolyze in aqueous solutions to form acids over a period of from 10 minutes to 1 hour.

In a thirtieth aspect, the disclosure provides a kit for preparing and/or making a digestible spheroid stabilizing hydrogel of the twenty-ninth aspect, in which the kit further includes: (d) a 3D cell culture substrate.

In a thirty-first aspect, the disclosure provides a kit for preparing and/or making a digestible spheroid stabilizing hydrogel of the thirtieth aspect, in which the 3D cell culture substrate has an array of microwells including at least one capillary structure and spheroid inducing geometry.

In a thirty-second aspect, the disclosure provides a kit for preparing and/or making a digestible spheroid stabilizing hydrogel of the thirtieth or the thirty-first aspect, in which the 3D cell culture substrate includes at least a portion of a cell culture container.

In a thirty-third aspect, the disclosure provides a kit for preparing and/or making a digestible spheroid stabilizing hydrogel of the thirty-second aspect, in which the cell culture container is chosen from a multiwall plate, a dish, a flask, a tube, a multi-layer flask, a soft-sided flask, or a bag.

In a thirty-fourth aspect, the disclosure provides a kit for preparing and/or making a digestible spheroid stabilizing hydrogel of the thirty-first to the thirty-third aspects, in which the at least one capillary structure of the 3D cell culture substrate is chosen from a ridge, a fissure, a pillar, a discontinuous wall, a corrugated wall, a mouth, a parabolic well shape, a sinusoidal well shape, or combination thereof.

In a thirty-fifth aspect, the disclosure provides a kit for preparing and/or making a digestible spheroid stabilizing hydrogel of the thirty-first to the thirty-fourth aspects, in which the spheroid inducing geometry includes a pillar, a discontinuous wall, a corrugated wall, a rounded cell bottom, a dimpled well bottom, a pit, a pen tip area, or combination thereof.

In a thirty-sixth aspect, the disclosure provides a kit for preparing and/or making a digestible spheroid stabilizing hydrogel of the thirtieth to the thirty-fifth aspects, in which the 3D cell culture substrate is a spheroid vessel.

In a thirty-seventh aspect, the disclosure provides a kit for preparing and/or making a digestible spheroid stabilizing hydrogel of the twenty-ninth to the thirty-sixth aspects, in which the gelation agent including the PGA compound includes pectic acid.

In a thirty-eighth aspect, the disclosure provides a kit for preparing and/or making a digestible spheroid stabilizing hydrogel of the twenty-ninth to the thirty-seventh aspects, in which the salt of the divalent ion includes a calcium salt.

In a thirty-ninth aspect, the disclosure provides a kit for preparing and/or making a digestible spheroid stabilizing hydrogel of the twenty-ninth to the thirty-eighth aspects, in which the salt of the divalent ion includes a calcium salt chosen from calcium carbonate, calcium sulfate, calcium phosphate, or combination thereof.

In a fortieth aspect, the disclosure provides a kit for preparing and/or making a digestible spheroid stabilizing hydrogel of the twenty-ninth to the thirty-ninth aspects, in which the salt of the divalent ion is calcium carbonate.

In a forty-first aspect, the disclosure provides a kit for preparing and/or making a digestible spheroid stabilizing hydrogel of the twenty-ninth to the fortieth aspects in which the salt of the divalent ion is a calcium salt having a water solubility of from about 0 mg/L to about 20 mg/L at 25° C.

In a forty-second aspect, the disclosure provides a kit for preparing and/or making a digestible spheroid stabilizing hydrogel of the twenty-ninth to the forty-first aspects, in which the kit further includes digesting agents for breaking down the digestible spheroid stabilizing hydrogel, wherein the digesting agents include a pectinase or alginase and a chelator chosen from ethylenediaminetetraacetic acid (EDTA), cyclohexanediaminetetraacetic (CDTA), ethylene glycol tetraacetic acid (ETGA), citric acid, tartaric acid, or combination thereof.

In a forty-third aspect, the disclosure provides a kit for preparing and/or making a digestible spheroid stabilizing hydrogel of the forty-second aspect, in which the chelator includes ethylenediaminetetraacetic acid (EDTA).

In a forty-fourth aspect, the disclosure provides a kit for preparing and/or making a digestible spheroid stabilizing hydrogel of the twenty-ninth to the forty-third aspects, in which the kit further includes cell culture medium.

In a forty-fifth aspect, the disclosure provides a kit for preparing and/or making a digestible spheroid stabilizing hydrogel of the forty-fourth aspect, in which the cell culture medium includes a calcium-free or calcium-chelated cell culture medium.

In a forty-sixth aspect, the disclosure provides a kit for preparing and/or making a digestible spheroid stabilizing hydrogel of the forty-fourth or forty-fifth aspect, in which the PGA compound is mixed with the cell culture medium.

In a forty-seventh aspect, the disclosure provides a kit for preparing and/or making a digestible spheroid stabilizing hydrogel of the forty-fourth or forty-fifth aspect, in which the PGA compound is a separate solution from the cell culture medium.

In a forty-eighth aspect, the disclosure provides a kit for preparing and/or making a digestible spheroid stabilizing hydrogel of the twenty-ninth to the forty-seventh aspects, in which the proton donor includes gluconolactone.

EXAMPLES

The embodiments described herein will be further clarified by the following examples.

Example 1

Impact of Overlaid Digestible PGA Spheroid Stabilizing Hydrogel on Cell Viability Experimental Protocol. The impact of an overlaid digestible PGA spheroid stabilizing hydrogel on viability of Hep G2 cells was studied. More specifically, the impact of an overlaid digestible PGA spheroid stabilizing hydrogel on viability of Hep G2 cells grown on a 2D cell culture monolayer and of Hep G2 cells grown on a 3D cell culture substrate into spheroids was studied.

2D Cell Culture Monolayer. Hep G2 cells (ATCC; HB-8065) were prepared for seeding on a 2D cell culture substrate by growing the Hep G2 cells in a Corning T-75 flask (~3×10$^6$ cells per flask) in cell culture medium. The cell culture medium was Minimum Essential Media with GlutaMAX and Earle's Salt from ThermoFisher with 1× Penicillin-Streptomycin from ThermoFisher and 10% Fetal Bovine Serum from ThermoFisher. The Hep G2 cells were grown in the T-75 flask to ~90% confluency. Then, the cell culture medium was removed from the T-75 flask and 2.5 mL 0.25% trypsin-ethylenediaminetetraacetic acid (i.e., EDTA) solution (ThermoFisher) was added to the T-75 flask. The T-75 flask was incubated at 37° C. for 5 minutes via standard tissue culture using a $CO_2$ incubator at 37° C., 5% $CO_2$, and RH~95%. 12.5 mL of minimum essential media (i.e., MEM; Catalog No. 11095080, Thermo Fisher Scientific, Waltham, MA) plus 10% fetal bovine serum (i.e., FBS; Catalog No. 35-010-CV, Corning, Incorporated, Corning, NY) was added to the T-75 flask to form a mixture. The mixture was then pipetted up and down several times to break up any clusters of Hep G2 cells. 20 µL of the mixture was then placed into a cellometer (Cellometer Auto T4, Nexcelom, Lawrence, MA) and Hep G2 cells were counted per mL of mixture. Hep G2 cells were then diluted to a final concentration of ~4×10$^5$ cells per mL in 35 mL of MEM+ 10% FBS.

Upon preparing the Hep G2 cells for seeding in a 2D cell culture substrate, the Hep G2 were then seeded onto a 2D cell culture substrate (Catalog no. 430641U cell culture flask from Corning Inc.) by aliquoting 5 mL of diluted Hep G2 cells in MEM+10% FBS per well. The Hep G2 cells were allowed to sit at room temperature for 30 minutes prior to incubating. The Hep G2 cells in the 2D cell culture substrate were then incubated at 37° C. in an incubator (NAPCO Series 8000 DH $CO_2$ Incubator from Fisher Scientific) with 5% $CO_2$ and 95% RH overnight (~16 hours).

A digestible PGA spheroid stabilizing hydrogel (hereinafter, "PGA hydrogel") was prepared and overlaid in L-15 medium (ATCC® 30-2008™ Catalog No. 21083027, Thermo Fisher Scientific). In preparation for the PGA hydrogel to be overlaid, any remaining liquid was removed from the wells of the 2D cell culture substrate and 1 mL of polygalacturonic acid (i.e., PGA or pectic acid; Sigma Aldrich #P3850) in L-15 medium was added to each well of the 2D cell culture substrate and allowed to incubate at room temperature for 5 minutes. The PGA was added at a concentration of 1% weight/weight of PGA to Leibovitz's medium. The PGA in L-15 medium was then removed from the wells.

The PGA hydrogel was prepared by adding PGA in L-15 medium to a 15 mL conical tube (Corning, Inc.); the PGA was added such that the concentration was 1% weight/weight in the L-15 medium. Then, calcium carbonate (i.e., $CaCO_3$; Sigma Aldrich Product Number: 795445G) was added to a concentration of 1 mg/mL. The $CaCO_3$ was mixed well prior to addition to the PGA in L-15 medium to avoid settling on the bottom of the 15 mL conical tube. The 15 mL conical tube was then vortexed briefly (~2 seconds) to ensure that the $CaCO_3$ was homogenously distributed in the PGA in L-15 medium. Glucono delta-lactone (i.e., GDL; Sigma Aldrich) was then added to the $CaCO_3$ homogenously distributed in the PGA in L-15 medium. The GDL was added to a final concentration of ~3.56 mg/mL. The 15 mL conical tube was then inverted several times to ensure proper mixing of the PGA in the L-15 medium, $CaCO_3$, and GDL. After inversion, 1-2 mL of the mixture of PGA in the L-15 medium, $CaCO_3$, and GDL was added to each well of the 2D cell culture substrate. Gelation of the mixture of PGA in L-15 medium, $CaCO_3$, and GDL was allowed to occur at room temperature for about 30 minutes, forming the overlaid PGA hydrogel. To provide control wells, in lieu of adding the mixture of PGA in the L-15 medium, $CaCO_3$, and GDL, 1-2 mL (~220 µL/cm$^2$) of L-15 medium was added to control wells.

The 2D cell culture substrate was then stored overnight in a refrigerator at a temperature of from about 2° C. to about 8° C.

Live/dead cell staining was then performed in accordance with the following protocol. The 2D cell culture substrate was removed from storing at 5° C., and allowed to warm to room temperature for about 15 minutes. Then, an equal volume (1-2 mL depending on the volume of the PGA/$CaCO_3$ and GDL mixture added to wells) of Dulbecco's phosphate-buffered saline, free of calcium and magnesium (i.e., DPBS; ThermoFisher) was added to each well of the 2D cell culture substrate and allowed to incubate for 5 minutes. The DPBS was then removed from each well, taking care not to remove any of the overlaid PGA hydrogel.

A live/dead cell staining solution was prepared by adding 15 µL of red-fluorescent ethidium homodimer and 7.5 mL of green-fluorescent calcein AM to 15 mL of DPBS and mixing well, via use of the LIVE/DEAD™ Viability/Cytotoxicity Kit, for mammalian cells (Catalog No. L3224, Thermo Fisher Scientific). Red-fluorescent ethidium homodimer indicates the loss of plasma membrane integrity, wherein intact plasma membranes are distinguishing characteristics of live cells; in contrast, green-fluorescent calcein AM indicates intracellular esterase activity, wherein ubiquitous intracellular esterase activity is a distinguishing characteristic of live cells. In this way, live cells may be discriminated from dead cells via simultaneous staining with the red-fluorescent ethidium homodimer and green-fluorescent calcein AM.

Then, an equal volume of the prepared live/dead cell staining solution was added to the overlaid PGA hydrogel in each well (i.e., to 1 mL PGA hydrogel, 1 mL of the prepared live/dead cell staining solution was added). The added live/dead cell staining solution was then incubated at 5° C. for two hours. Following incubation, the cells were examined under a Nikon ECLIPSE Ti bright-field microscope and a Nikon ECLIPSE Ti fluorescence microscope to visualize live cells (i.e., those exhibiting green fluorescence) and dead cells (i.e., those exhibiting red fluorescence).

3D Cell Culture. Hep G2 cells were prepared for seeding on a 3D cell culture substrate by growing the Hep G2 cells in a T-75 flask (~3×10$^6$ cells per flask) in cell culture medium. The Hep G2 cells were grown in the T-75 flask to ~90% confluency. Then, the cell culture medium was removed from the T-75 flask and 2.5 mL 0.25% trypsin-EDTA solution was added to the T-75 flask. The T-75 flask was incubated at 37° C. for 5 minutes in a $CO_2$ incubator at 5% $CO_2$ with 95% RH. 12.5 mL of MEM (Catalog No. 11095080, Thermo Fisher Scientific) plus 10% FBS (Catalog No. 35-010-CV, Corning, Incorporated) was added to the T-75 flask to form a mixture. The mixture was then pipetted up and down several times to break up any clusters of Hep G2 cells. 20 µL of the mixture was then placed into a cellometer (Nexcelom, Lawrence, MA) and Hep G2 cells were counted per mL of mixture. Hep G2 cells were then diluted to a final concentration of ~3.2×10$^5$ cells per mL in 35 mL of MEM+10% FBS.

Upon preparing the Hep G2 cells for seeding in a 3D cell culture substrate, the Hep G2 were seeded onto a 3D cell culture substrate by aliquoting 5 mL of diluted Hep G2 cells in MEM+10% FBS per well. Each well of the 3D cell culture substrate includes 1300 microcavities. Approximately 1200 Hep G2 cells were seeded into each microcavity. The Hep G2 cells were allowed to sit at room temperature for 30 minutes prior to incubating. The Hep G2 cells in the 3D cell culture substrate were then incubated at 37° C. in an incubator with 5% $CO_2$ and 95% RH for three days to form spheroids (1500 cells/spheroid).

A PGA hydrogel was prepared and overlaid in L-15 medium (Catalog No. 21083027, Thermo Fisher Scientific). In preparation for the PGA hydrogel to be overlaid, any remaining liquid was removed from the wells of the 3D cell culture substrate taking care not to aspirate any spheroids. Then, 1 mL of PGA in L-15 medium was added to each well of the 3D cell culture substrate and allowed to incubate at room temperature for 5 minutes. The PGA in L-15 medium was then removed from the wells, again taking care not to aspirate any spheroids.

The PGA hydrogel was prepared by adding PGA in L-15 medium to a 15 mL conical tube; the PGA was added such that the concentration was 1% weight/weight in the L-15 medium. Then, $CaCO_3$ was added to a concentration of 1 mg/mL. The $CaCO_3$ may be mixed well prior to addition to the PGA in L-15 medium to avoid settling on the bottom of the 15 mL conical tube. The 15 mL conical tube was then vortexed briefly (~2 seconds) to ensure that the $CaCO_3$ was homogenously distributed in the PGA in L-15 medium. GDL was then added to the $CaCO_3$ homogenously distributed in the PGA in L-15 medium. The GDL was added to a final concentration of ~3.56 mg/mL. The 15 mL conical tube was then inverted several times to ensure proper mixing of the PGA in the L-15 medium, $CaCO_3$, and GDL. After inversion, 2-3 mL of the mixture of PGA in the L-15 medium, $CaCO_3$, and GDL was added to each well of the 3D cell culture substrate. Gelation of the mixture of PGA in the L-15 medium, $CaCO_3$, and GDL was allowed to occur at room temperature for about 30 minutes, to form the PGA hydrogel. To provide control wells, in lieu of adding the mixture of PGA in the L-15 medium, $CaCO_3$, and GDL, 1 mL of L-15 medium was added to control wells, incubated for 5 minutes, removed, and then 2-3 mL of L-15 medium was added to control wells.

The 3D cell culture substrate was then stored overnight in a refrigerator at a temperature of from about 2° C. to about 8° C.

Live/dead cell staining was then performed in accordance with the following protocol. The 3D cell culture substrate was removed from storing at 5° C. and allowed to warm to room temperature for about 15 minutes. Then, an equal volume (1-2 mL depending on the volume of the PGA/$CaCO_3$ and GDL mixture added to wells) of DPBS was added to each well of the 3D cell culture substrate and allowed to incubate for 5 minutes. The DPBS was then removed from each well, taking care not to remove any of the PGA hydrogel.

A live/dead cell staining solution was prepared by adding 15 µL red-fluorescent ethidium homodimer and 7.5 mL of green-fluorescent calcein AM to 15 mL of DPBS and mixing well, via use of the LIVE/DEAD' Viability/Cytotoxicity Kit, for mammalian cells (Catalog No. L3224, Thermo Fisher Scientific). Red-fluorescent ethidium homodimer indicates the loss of plasma membrane integrity, wherein intact plasma membranes are distinguishing characteristics of live cells; in contrast, green-fluorescent calcein AM indicates intracellular esterase activity, wherein ubiquitous intracellular esterase activity is a distinguishing characteristic of live cells. In this way, live cells may be discriminated from dead cells via simultaneous staining with the red-fluorescent ethidium homodimer and green-fluorescent calcein AM.

Then, equal volumes of the prepared live/dead cell staining solution was added to the PGA hydrogel in each well (i.e., to 1 mL PGA hydrogel, 1 mL of the prepared live/dead cell staining solution was added). The added live/dead cell staining solution was then allowed to incubate at 5° C. for two hours. The cells were then examined under a bright-field microscope and under a fluorescence microscope to visualize live cells (green fluorescence) and dead cells (red fluorescence).

Results. Referencing FIGS. 3A-C and 4A-C, Hep G2 cells grown on a 2D cell culture monolayer with an overlaid PGA hydrogel exhibited greater viability (see e.g., FIGS. 4B-C) than control Hep G2 cells grown on the 2D cell culture substrate without a PGA hydrogel (see e.g., FIGS. 3B-C). Referencing FIGS. 5A-C and 6A-C, Hep G2 spheroids grown on the 3D cell culture substrate with an overlaid PGA hydrogel exhibited greater viability (see e.g., FIGS. 6B-C) than control Hep G2 spheroids grown on the 3D cell culture substrate without a PGA hydrogel (see e.g., FIGS. 5B-C). In view of such enhanced viability, and without being bound the theory, it is believed that the overlaid PGA hydrogel provided cell preserving properties to Hep G2 cells during incubation.

Example 2

Drop Test of Spheroids Grown on 3D Cell Culture Substrate with Overlaid PGA Hydrogel Experimental Protocol. To mimic transportation of spheroids, a drop test was performed on Hep G2 spheroids grown on a 3D cell culture substrate with an overlaid PGA hydrogel. The Hep G2 spheroids grown on the 3D cell culture substrate with an overlaid PGA hydrogel were prepared as described in the experimental protocol of Example 1; live/dead cell staining was also performed as described in the experimental protocol of Example 1, with live/dead staining of cells in the 3D microcavity plate prior to the drop test to observe the overall health of the cells on a control plate. The test plate was incubated with the live/dead solution overlaid on the PGA hydrogel at 5° C. for 2 hours to allow the solution to penetrate the hydrogel layer and into the cells prior to visualization. Additionally, control Hep G2 spheroids grown on a 3D cell culture substrate without a PGA hydrogel were prepared as described in the experimental protocol of Example 1; live/dead cell staining was also performed as described in the experimental protocol of Example 1 and as described above. The 3D cell culture substrate with Hep G2 spheroids and an overlaid PGA hydrogel was wrapped in a layer of bubble wrap (~2" in thickness) and packaged into cardboard shipment boxes. The 3D cell culture substrate with control Hep G2 spheroids without a PGA hydrogel was also wrapped in a layer of bubble wrap (~2" in thickness) and packaged into cardboard shipment boxes.

A drop test was then performed by dropping the cardboard shipment boxes from a height of ~1.5 m 5-10 times. The 3D cell culture substrate packaged within the cardboard shipment boxes were recovered following performance of the drop test, and the 3D cell culture substrate was examined visually with the naked eye, and under a bright-field microscope and a fluorescence microscope, to determine displacement of the overlaid PGA hydrogel and/or spheroids.

Results. Referencing FIGS. 7A-C and 8A-C, the microcavities of the 3D cell culture substrate with an overlaid PGA hydrogel exhibited greater retention of Hep G2 spheroids (see e.g., FIGS. 8A-C) following the drop test than the microcavities of the control 3D cell culture substrate without a PGA hydrogel (see e.g., FIGS. 7A-C). As also shown in FIGS. 7A-C, the wells of the 3D cell culture substrate with an overlaid PGA hydrogel stayed intact with Hep G2 spheroids remaining therein following the drop test. In view of such retention, and without being bound by the theory, it is believed that Hep G2 spheroids provided in 3D cell culture substrates with an overlaid PGA hydrogel would not be displaced therefrom and/or form uncontrolled aggregates during transportation thereof.

Example 3

Recovery of Hep G2 Cells Grown on a 2D Cell Culture Monolayer and Spheroids Grown on a 3D Cell Culture Substrate with Overlaid PGA Hydrogel Experimental Protocol. Recovery of spheroids from 3D cell culture substrates with an overlaid PGA hydrogel was performed. The Hep G2 cells grown on the 2D cell culture monolayer with an overlaid PGA hydrogel were prepared as described in the experimental protocol of Example 1. Additionally, the Hep G2 spheroids grown on the 3D cell culture substrate with an overlaid PGA hydrogel were prepared as described in the experimental protocol of Example 1. Then, a PGA digestion solution was prepared. For digestion of Hep G2 cells grown on the 2D cell culture monolayer with the overlaid PGA hydrogel, the PGA digestion solution was prepared by adding pectinase (from Sigma Aldrich) to a final concentration of 200 U/mL and EDTA to a final concentration of 20 mM to DPBS. For digestion of Hep G2 spheroids grown on the 3D cell culture substrate with the overlaid PGA hydrogel, the PGA digestion solution was prepared by adding pectinase (Sigma Aldrich) to a final concentration of 100 U/mL and EDTA to a final concentration of 10 mM to DPBS.

Any remaining liquid was then removed from wells of the 2D culture substrate and the 3D cell culture substrate. Then, to the 2D cell culture substrate, a volume of the 2D cell culture monolayer PGA digestion solution which was equal to that of the PGA hydrogel was added to each well. For example, for a well containing 2 mL of the overlaid PGA hydrogel, a corresponding 2 mL of the 2D cell culture monolayer PGA digestion solution was added to such well. In this way, a final concentration of 100 U/mL of pectinase and 10 mM EDTA was achieved in each well of the 2D cell culture substrate. To the 3D cell culture substrate, a volume of the 3D cell culture substrate PGA digestion solution which was 2× that of the PGA hydrogel was added to each well. For example, for a well containing 2 mL of the overlaid PGA hydrogel, 4 mL of the 3D cell culture substrate PGA digestion solution was added to such well. Then, the PGA digestion solutions were allowed to incubate in the wells for 30 minutes at room temperature. According to embodiments of this disclosure, it is contemplated that the exact time required for digestion will depend on particular concentrations of reagents in ease case. In some embodiments, this time can range from about 15 minutes to about 1 hour. During this time period, the PGA digestion solutions act to digest and solubilize the PGA matrices, breaking down polygalacturonic acid into monogalacturonic acid.

Then, any remaining liquid is removed from the wells and 2 mL DPBS was added to each well. In lieu of adding DPBS (such as, e.g., to perform spheroid harvesting), cell culture media may be added for continuing spheroid cell culture.

It will be appreciated by those skilled in the art that changes could be made to the embodiments described above without departing from the broad inventive concept thereof. It is understood, therefore, that this disclosure is not limited to the particular embodiments disclosed but is intended to cover modifications that are within the spirit and scope of the disclosure, as defined by the appended claims.

All documents cited are incorporated herein by reference; the citation of any document is not to be construed as an admission that it is prior art with respect to the present disclosure.

It is to be further understood that where descriptions of various embodiments use the term "comprising," and/or "including" those skilled in the art would understand that in some specific instances, an embodiment can be alternatively described using language "consisting essentially of" or "consisting of."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "about" in reference to a dimension of a component and/or ranges thereof, and/or a quantity of a component in a composition, such as, e.g., a digestible spheroid stabilizing hydrogel, a concentration, a volume, a process temperature, a process time, a yield, a flow rate, a pressure, a viscosity, and/or like values and ranges thereof, as employed in describing embodiments of this disclosure, refers to variation in a numerical quantity that can occur, such as, e.g., through: typical measuring and/or handling procedures for preparing materials, compositions, components of compositions, and the like; inadvertent error in procedures; and/or differences in the manufacture, source, and/or purity of starting materials and/or components used to carry out methods. The term "about" also encompasses amounts that differ due to aging of a composition with a particular initial concentration and/or mixture and amounts that differ due to mixing and/or processing a composition with a particular initial concentration and/or mixture.

What is claimed is:

1. A kit for making a spheroid-stabilizing hydrogel in a calcium-free or calcium-chelated cell culture media, the kit comprising:
    (a) a gelation agent comprising a polygalacturonic acid (PGA) compound or an alginic acid compound, wherein the PGA compound comprises at least one of:
        (i) pectic acid or salts thereof, or
        (ii) partially esterified pectic acid having a degree of esterification from about 1 to about 40 mol % or salts thereof;
    (b) a crosslinking agent, wherein the crosslinking agent comprises a salt of a divalent ion; and
    (c) a proton donor, wherein the proton donor comprises lactones, esters, or other compounds that hydrolyze in aqueous solutions to form acids over a period of from 10 minutes to 1 hour;
    (d) wherein a molar ratio of the crosslinking agent to the proton donor is about 2:1.

2. The kit according to claim 1, wherein the PGA compound is mixed with the calcium-free or calcium-chelated cell culture media.

3. The kit according to claim 1, wherein the PGA compound is a separate solution from the calcium-free or calcium-chelated cell culture media.

4. The kit according to claim 1, wherein the proton donor is gluconolactone.

5. The kit according to claim 1, wherein the crosslinking agent is a calcium salt.

6. The kit according to claim 5, wherein the calcium salt is chosen from calcium carbonate, calcium sulfate, calcium phosphate, or combination thereof.

7. The kit according to claim 5, wherein the calcium salt comprises calcium carbonate.

8. The kit according to claim 5, wherein the calcium salt has a water solubility of from greater than 0 mg/L to about 20 mg/L at 25° C.

9. The kit according to claim 1, further comprising a three-dimensional (3D) cell culture substrate.

10. The kit according to claim 9, wherein the 3D cell culture substrate has an array of microwells comprising at least one capillary structure and spheroid inducing geometry.

11. The kit according to claim 9, wherein the 3D cell culture substrate comprises at least a portion of a cell culture container.

12. The kit according to claim 1, further comprising a spheroid vessel.

13. The kit according to claim 1, further comprising digesting agents for breaking down the spheroid stabilizing hydrogel, wherein the digesting agents comprise a pectinase and a chelator chosen from ethylenediaminetetraacetic acid (EDTA), cyclohexanediaminetetraacetic (CDTA), ethylene glycol tetraacetic acid (ETGA), citric acid, tartaric acid, or combination thereof.

14. A method for preparing a digestible spheroid stabilizing hydrogel, the method comprising:
   (a) providing a crosslinking agent comprising a calcium salt and a proton donor comprising gluconolactone with an aqueous medium comprising a gelation agent comprising a polygalacturonic acid (PGA) compound or an alginic compound, wherein the PGA compound comprises at least one of:
      (i) pectic acid or salts thereof, or
      (ii) partially esterified pectic acid having a degree of esterification from about 1 to about 40 mol % or salts thereof; and
   (b) providing a three-dimensional (3D) cell culture substrate comprising spheroids prior to gelation of the digestible spheroid stabilizing hydrogel, such that the digestible spheroid stabilizing hydrogel forms in situ; wherein the PGA compound is crosslinked via the crosslinking agent and the proton donor to form the digestible spheroid stabilizing hydrogel.

15. The method according to claim 14, further comprising adding pectinase or alginate lyase to dissociate the hydrogel and release spheroids from the hydrogel.

16. The method according to claim 14, wherein the aqueous medium comprises a cell culture medium.

17. The method according to claim 14, wherein (a) providing the crosslinking agent and the proton donor with the aqueous medium comprising the gelation agent comprising the PGA compound comprises:
   (1) mixing the crosslinking agent with the aqueous medium comprising the PGA compound to form an aqueous solution, and
   (2) initiating crosslinking of the PGA compound via providing the gluconolactone with the aqueous solution.

18. The method according to claim 14, wherein the digestible spheroid stabilizing hydrogel comprises:
   about 1% weight/weight of the PGA compound, wherein the PGA compound is the pectic acid; and
   a molar ratio of the crosslinking agent to the proton donor of about 2:1.

19. The method according to claim 14, wherein:
   the 3D cell culture substrate has an array of microwells comprising at least one capillary structure and spheroid inducing geometry,
   the spheroids are disposed in the array of microwells, and the providing of (b) comprises applying the crosslinking agent, the proton donor, and the aqueous medium comprising the gelation agent comprising the polygalacturonic acid (PGA) compound of (a) to at least one of the microwells.

* * * * *